US012475363B2

(12) United States Patent
Wong-VanHaren

(10) Patent No.: US 12,475,363 B2
(45) Date of Patent: Nov. 18, 2025

(54) TENSOR PROCESSOR VISUALIZATION AND ANALYSIS TOOL

(71) Applicant: Groq, Inc., Mountain View, CA (US)

(72) Inventor: Mark Wong-VanHaren, Palo Alto, CA (US)

(73) Assignee: Groq, Inc., San Jose, CA (US)

(*) Notice: Subject to any disclaimer, the term of this patent is extended or adjusted under 35 U.S.C. 154(b) by 540 days.

(21) Appl. No.: 17/982,439

(22) Filed: Nov. 7, 2022

(65) Prior Publication Data

US 2023/0141657 A1 May 11, 2023

Related U.S. Application Data

(60) Provisional application No. 63/277,075, filed on Nov. 8, 2021.

(51) Int. Cl.
*G06N 3/063* (2023.01)
*G06F 13/42* (2006.01)

(52) U.S. Cl.
CPC ............. *G06N 3/063* (2013.01); *G06F 13/42* (2013.01)

(58) Field of Classification Search
CPC .......... G06N 3/063; G06N 7/01; G06N 3/045; G06F 13/4295; G06F 1/10; G06F 9/30014; G06F 15/173; G06F 11/3698; G06F 17/16; G06F 12/0875; G06F 16/367; G06F 13/42; G06F 13/4022; H04L 49/25; Y02D 10/00; G05B 2219/25433
See application file for complete search history.

(56) References Cited

U.S. PATENT DOCUMENTS

| 10,825,536 | B1* | 11/2020 | Yang | G06N 20/00 |
|---|---|---|---|---|
| 11,243,880 | B1* | 2/2022 | Ross | G06F 12/0207 |
| 11,983,094 | B2* | 5/2024 | Downie | G06F 11/3698 |
| 2019/0340532 | A1* | 11/2019 | Ducore | G06F 8/443 |
| 2019/0354846 | A1* | 11/2019 | Mellempudi | G06F 9/30014 |
| 2020/0306927 | A1* | 10/2020 | Tanikella | G06F 18/40 |
| 2020/0311183 | A1* | 10/2020 | Simpson | G06F 17/16 |

(Continued)

FOREIGN PATENT DOCUMENTS

| CN | 112148664 A | * 12/2020 | G06F 9/3005 |
|---|---|---|---|
| CN | 112307217 A | * 2/2021 | G06F 16/367 |

(Continued)

*Primary Examiner* — Steven P Sax
(74) *Attorney, Agent, or Firm* — Dority & Manning, P.A.

(57) ABSTRACT

A visualizer receives a compiled program to be run on a tensor streaming processor, which indicates a predetermined timing at which each functional unit of the processor receives instructions for processing data, and generates a visualization model used to display a schedule comprising elements corresponding to instructions received by each functional unit of a data path of the processor, arranged based upon a time at which each instruction is executed by its respective functional unit in accordance with the generated model. Due to the deterministic nature of the tensor streaming processor, the visualizer infers the flow of data across communication lanes of the processor, and to predicts the location of data within the processor for a given cycle during execution of the compiled program, without the need to actually execute the compiled program or to implement breakpoints within the program at specific cycles.

19 Claims, 25 Drawing Sheets

(56) References Cited

U.S. PATENT DOCUMENTS

| | | | |
|---|---|---|---|
| 2020/0327084 A1* | 10/2020 | Choudhary | G06F 12/0875 |
| 2020/0327088 A1* | 10/2020 | Choudhary | G06F 1/10 |
| 2021/0200545 A1* | 7/2021 | Marolia | G06F 9/30145 |
| 2022/0083844 A1* | 3/2022 | Khaitan | G06F 17/16 |
| 2022/0129521 A1* | 4/2022 | Surti | G06F 15/173 |

FOREIGN PATENT DOCUMENTS

| | | | | |
|---|---|---|---|---|
| CN | 113228114 A * | 8/2021 | | G06N 3/045 |
| CN | 113508066 A * | 10/2021 | | G06N 7/01 |
| CN | 116261720 A * | 6/2023 | | G06F 11/3698 |
| CN | 110383340 B * | 7/2023 | | G06T 7/50 |
| WO | WO-2021045904 A1 * | 3/2021 | | G06N 3/045 |
| WO | WO-2021183105 A1 * | 9/2021 | | G06N 3/045 |

* cited by examiner

TENSOR PROCESSOR VISUALIZATION AND ANALYSIS TOOL

CROSS-REFERENCE TO RELATED APPLICATIONS

This application claims a benefit and priority under 35 U.S.C. § 119 (e) to U.S. Provisional Patent Application Ser. No. 63/277,075, filed on Nov. 8, 2021, which is hereby incorporated by reference in its entirety.

BACKGROUND

The present disclosure relates to tensor processors, and tools for visualization and analysis of complex instruction and data flows within such a processor.

A tensor processor, for example, a tensor streaming processor (TSP) having a functional slice architecture is used, e.g., to process mathematically intensive programs that enable models for machine-learning and/or predictions. Herein, a tensor, e.g., is a vector, a matrix, or higher order array of numerical data. Such processors execute as many as trillions of mathematical operations per second, typically vector-matrix multiplications. Programs for such processors are compiled to generate instructions mapped to specific functional units of the processor, for execution at specific times on a clock cycle-by-cycle basis—i.e., deterministic execution (which eliminates the need for techniques such as using source code instrumentation, processor event recorders, and trace files to measure performance). Sets of instructions and data flow in multiple directions across the electronic circuits of the processor, with flows redirected by switching circuit modules. The computational complexity of this huge number of executions, and multiple data movements in multiple directions, and their mapping to functional units and the specific points in time at which the instructions are executed is complex and difficult for a user to analyze and visualize. This is a significant problem for many programmers who have learned to visualize in their heads the movement of data and execution of instructions for simple computer processors such as those found in personal computers, to help them create more efficient programs (a similarly complex visualization to that of playing multiple games of chess simultaneously in competitions). But this visualization is extremely hard for programmers to visualize for complex architectures such as tensor processors.

Traditional visualizers for computers are simple in structure, because they were designed for very simple flows of data and instructions for processors found in, e.g., for personal RISC based computers, or were designed for the very simple flows across multiple simple computers, for data and instructions executing at 'slow speeds' (such as millions of operations each second). For example, data is retrieved from memory, loaded into a processor register, acted upon, and the result written to memory-a process easy to visualize. Or data is loaded from memory into 100 parallel processing units, acted upon with the instructions, and the results loaded back to memory. This process is similar to announcing a number, and waiting to see if one of 100 players yells "Bingo!".

These simple traditional visualizers fail to handle the complex and extremely high speed flows of instructions inside tensor processors such as the GroqChip™ TSP (available from Groq, Incorporated), where trillions of operations are performed each second, with both data and instructions flowing in multiple directions, flows which are dynamically redirected by switching units. Thus, there is a need for cycle-by-cycle instruction flow visualizers that can handle architectures as complex and high-speed as those of tensor processors.

SUMMARY

Embodiments of the present disclosure are directed to systems and methods for compiling programs to be executed on a tensor processor, such as a deterministic tensor streaming processor, and generating visualizations of the compiled programs for analysis by a user. Due to the deterministic nature of the processor on which the compiled program is to be run, the compiler generates the compiled program to schedule instructions to be executed by specific functional units of the processor with specific timing. This allows for a visualizer to infer the flow of data across communication lanes of the processor, and to predict the location of data within the processor for a given cycle during execution of the compiled program, without the need to actually execute the compiled program or to implement breakpoints within the program at specific cycles.

In one or more embodiments of the claimed inventions, an interactive user interface comprising at least a first interface region displays a schedule comprising instructions received by each functional unit of a process for one or more data paths, the schedule arranged based upon a time at which each instruction is executed by its respective functional unit.

In response to a user selecting an instruction received at a functional unit of the data path, the display is updated in the first interface region to display an indication of one or more other functional units of the data path configured to process data associated with an instruction before or after the selected instruction.

BRIEF DESCRIPTION OF THE DRAWINGS

The disclosed embodiments have advantages and features which will be more readily apparent from the detailed description and the accompanying figures. A brief introduction of the figures is below.

The figures depict embodiments of the present disclosure for purposes of illustration only. One skilled in the art will readily recognize from the following description that alternative embodiments of the structures and methods illustrated herein can be employed without departing from the principles, or benefits touted, of the disclosure described herein.

DETAILED DESCRIPTION

The Figures and the following description relate to preferred embodiments by way of illustration only. It should be noted that from the following discussion, alternative embodiments of the structures and methods disclosed herein will be understood as useful alternatives without departing from the principles of what is claimed.

Reference will now be made in detail to several embodiments, examples of which are illustrated in the accompanying figures. It is noted that wherever practicable similar or like reference numbers are used in the figures to indicate similar or like functionality. The figures depict embodiments of the disclosed system (or method) for purposes of illustration only. One skilled in the art will readily recognize from the following description that alternative embodiments of the structures and methods illustrated herein are useful without departing from the principles described herein.

Exemplary System

Figure 1A:
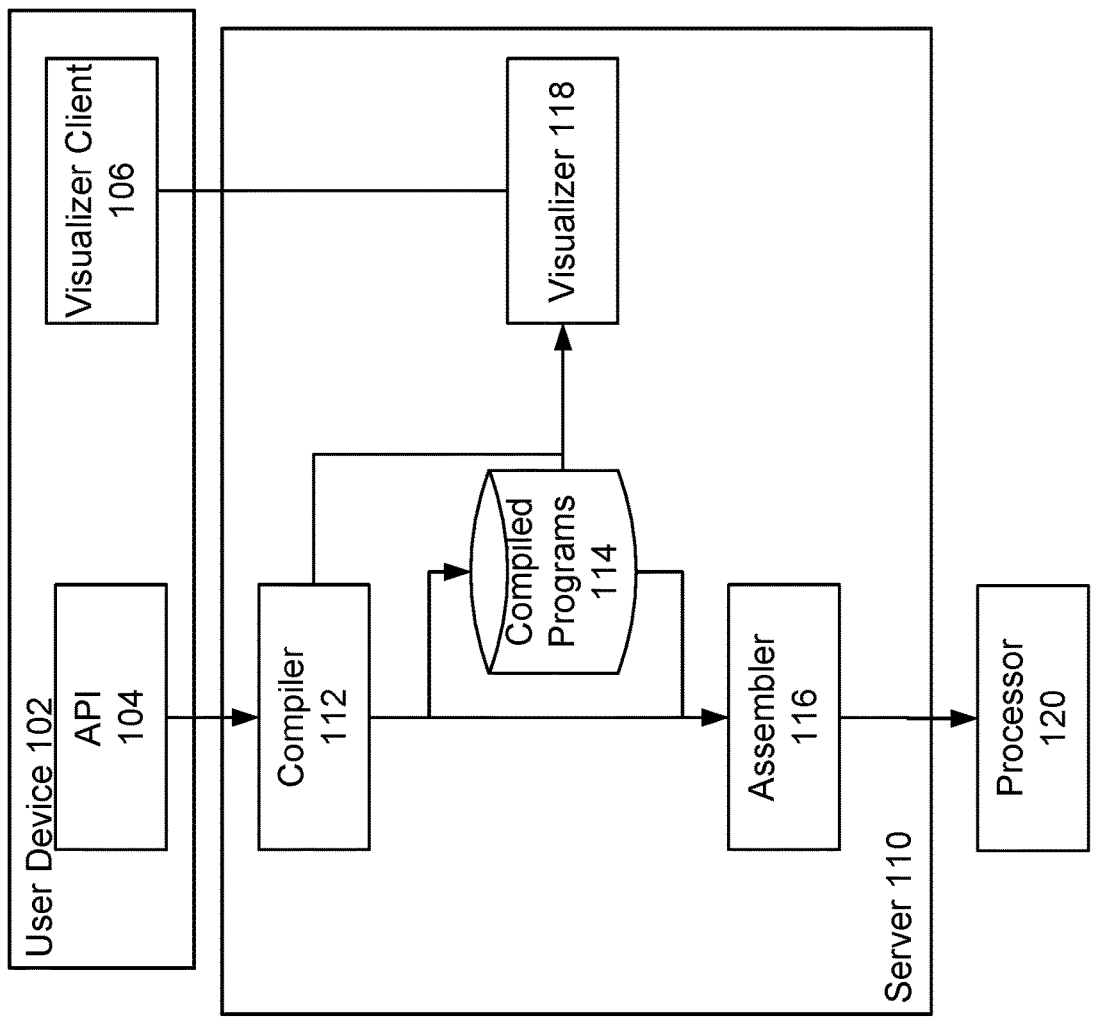
FIG. 1A illustrates a system for compiling programs to be executed on a specialized processor, and generating visualizations of the compiled programs for review by a user, according to an embodiment.

FIG. 1A illustrates a system 100 for compiling programs to be executed on a tensor processor, and for generating visualizations of the compiled programs for analysis by a user, according to an embodiment. The system 100 includes a user device 102, a server 110, and a processor 120. Each of these components, and their sub-components (if any) are described in greater detail below. Although a particular configuration of components is described herein, in other embodiments the system 100 may have different components and these components may perform the functions of the system 100 in a different order or using a different mechanism. For example, while FIG. 1A illustrates a single server 110, in other embodiments, compilation, assembly, and visualization functions may be performed on different devices. In addition, in some embodiments, at least a portion of the functions performed by the server 110 may be performed by the user device 102.

The user device 102 comprises any electronic computing device, such as a personal computer, laptop, or workstation, which uses an Application Program Interface (API) 104 to construct programs to be run on the processor 120. The server 110 receives a program specified by the user at the user device 102, and compiles the program to generate a compiled program 114. In some embodiments, a compiled program 114 enables a data model for predictions that processes input data and make a prediction from the input data. Examples of predictions are category classifications made with a classifier, or predictions of time series values. In some embodiments, the prediction model describes a machine learning model that includes nodes, tensors, and weights. In some embodiments, the prediction model is specified as a TensorFlow model, the compiler 112 is a TensorFlow compiler and the processor 120 is a tensor processor. In another embodiment, the prediction model is specified as a PyTorch model, the compiler is a PyTorch compiler. In other embodiments, other machine learning specification languages and compilers are used. For example, in some embodiments, the prediction model defines nodes representing operators (e.g., arithmetic operators, matrix transformation operators, Boolean operators, etc.), tensors representing operands (e.g., values that the operators modify, such as scalar values, vector values, and matrix values, which may be represented in integer or floating-point format), and weight values that are generated and stored in the model after training. In some embodiments, where the processor 120 is a tensor processor having a functional slice architecture (described in greater detail below in relation to FIGS. 2-4), the compiler 112, being aware of the hardware configuration of the processor 120, generates an explicit plan for how the processor will execute the program, by translating the program into a set of operations that can be are executed by the processor 120, specifying when each instruction will be executed, which functional slices will perform the work for which operations, and which stream registers will hold the operands. This type of scheduling is known as "deterministic scheduling."

The assembler 116 receives compiled programs 114 generated by the compiler 112, and performs final compilation and linking of the scheduled instructions to generate a compiled binary. In some embodiments, the assembler 114 maps the scheduled instructions indicated in the compiled program 112 to the hardware of the processor 120, and determines the exact component queue or slice in which to place each instruction.

The processor 120, e.g., is a hardware device with a massive number of matrix multiplier units that accepts a compiled binary assembled by the assembler 116, and executes the instructions included in the compiled binary. The processor 120 typically includes one or more blocks of circuitry for matrix arithmetic, numerical conversion, vector computation, short-term memory, and data permutation/switching. Once such processor 120 is a tensor processor having a functional slice architecture. In some embodiments, the processor 120 comprises multiple tensor processors connected together.

A visualizer application 118 (or visualizer 118) is configured to receive a compiled program 114 and generates a visualization model corresponding to the compiled program. While FIG. 1A illustrates the visualizer application 118 as being implemented as part of the server 110, it is understood that in other embodiments, the visualizer application 118 may be implemented by a separate device, such as a visualization server (not shown) separate from the server 110. In some embodiments, the visualizer 118 receives the compiled program 114 directly from the compiler 112, or receives a previously compiled program 114 from a compiled program storage. In some embodiments, by default, if the compiler 112 does not generate sufficient information for the visualizer 118, the user specifies (e.g., using a compiler flag) a special flag instructing the compiler 112 to generate the necessary data for the visualizer 118. In addition, the user can transfer a previously compiled program to the compiler as part of a command to the compiler to write data for the visualizer. In some embodiments, this additional data generated by the compiler relates to relationships between instructions (e.g., which instruction is configured to the process data placed on a stream by another instruction) that is used by the compiler 112 when scheduling instructions for visualization that is not needed by the assembler 116 to generate the compiled binary, and is thus typically not output by the compiler 112.

The user views the visualization models generated by the visualizer 118 at the user device 102 using the visualizer client 106. In some embodiments, the user device 102 receives from the server 110 an interactive visualization model generated by the visualizer 118 that is viewed and interacted with locally via the visualizer client 106, where the visualizer client 106 receives user inputs to dynamically update the visualizer 130 to generate a visualization model from a compiled application. In other embodiments, the visualizer client 106 transfers received user inputs to the visualizer 118, which remotely generates an updated visualization to be displayed to the user at the visualizer client 106. In some embodiments, the visualizer client 106 corresponds to a web browser or web client, wherein the user receives a Uniform Resource Locator (URL) corresponding to the location on the Internet of a desired visualization model from the visualization server 130, and then the user copies the URL into the web browser to view the visualization.

Example Visualizer

Figure 1B:
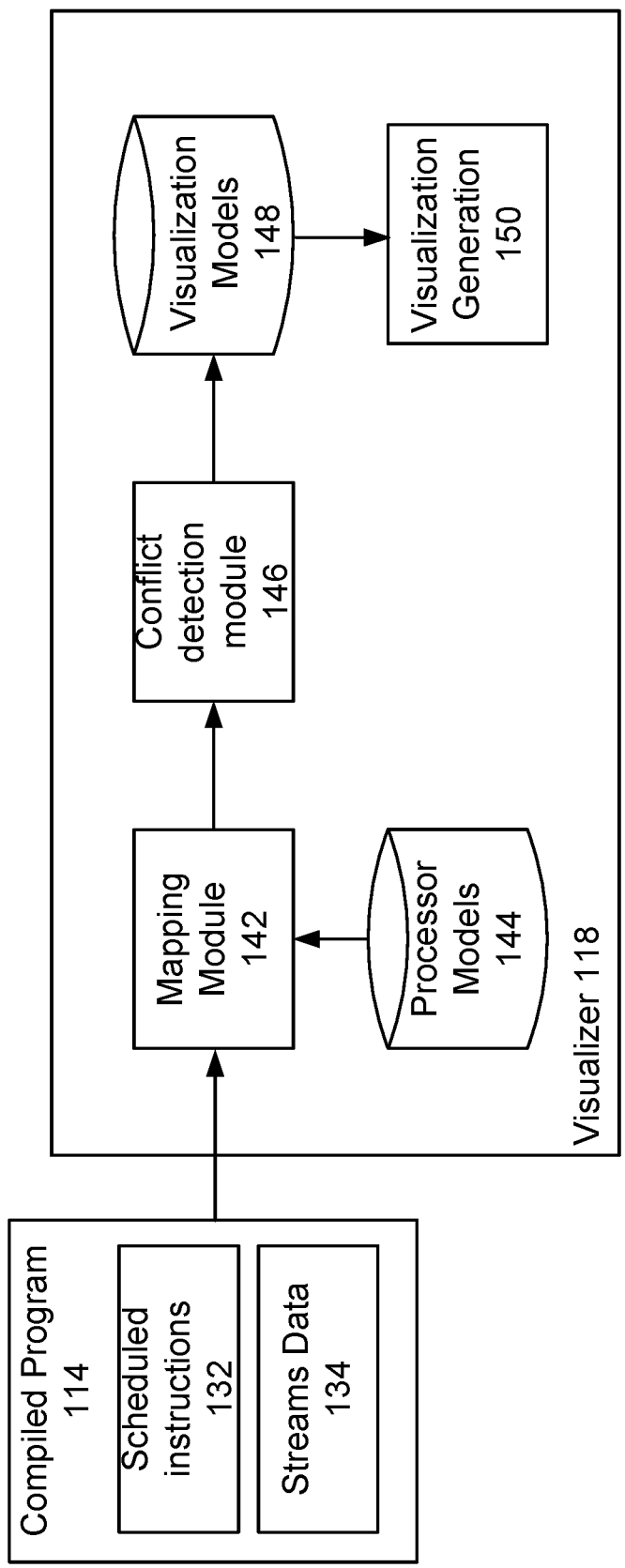
FIG. 1B illustrates a detailed block diagram of the visualizer, according to some embodiments.

FIG. 1B illustrates a detailed block diagram of the visualizer 118, according to some embodiments. The visualizer 118 includes a mapping module 142 and a conflict detection module 146, which are used to generate a visualization model 148 from a compiled program 114.

In some embodiments, the compiled program 114 includes scheduled instructions 132 (indicating on which functional units and during which cycles the instructions execute on) and streams data 134 (indicating input and output streams associated with each instruction). In some embodiments, the compiled program includes additional information (e.g., weight values) that is not used by the visualizer for generating a visualization model. The mapping module 142 analyzes the scheduled instructions 132 and streams data 132 of the compiled program 114 to map the program's instructions to a model of the processor 120.

The mapping module 142 identifies a layout of the processor 120 on which the compiled program 114 is to be run. In some embodiments, the mapping module 142 maintains a configuration of the processor 120 in the form of declarative code. In other embodiments, the mapping module 142 accesses a library of processor models 144 and selects an appropriate model onto which to map the scheduled instructions 132. For example, the compiled program 114 includes information indicating a processor architecture that the program is intended to run on, enabling the mapping module 142 to look up the correct processor model 144. In some embodiments, a program is configured to run on an architecture comprising multiple processors. In such cases, the mapping module 142 constructs an architecture model from multiple processor models 144. In some embodiments, commonly-used multi-processor architectures are pre-constructed and stored, to be accessed by the mapping module 142 when needed.

The processor model 144 indicates an architectural layout of the processor, as well as timing and behavior of operations on the processor, e.g., information indicating timing at which data arrives at a functional unit of the processor in order to be processed by an instruction received at the functional unit, a number of cycles needed by a functional unit to process each type of instruction to produce its output, streams accessible to each functional unit of the processor in each direction, a number of cycles needed for data to travel between functional units, etc. Using the model of the processor, the mapping module 142 confirms whether the timing information indicated by compile program 114 is correct. For example, in some embodiments, the compiled program 114, in addition to information indicating when and where on the processor the instructions are executed, indicates information on how different instructions are related to each other (e.g., which instructions provide the incoming data for another instruction, which instruction receives the output data of another instruction, etc.). Using the layout data of the processor model 144, the mapping module 142 confirms that the relationships between the different scheduled instructions align with the timing at which the processor is able to process instructions and data. In other embodiments, this information is not indicated in the compiled program 114, and the mapping module 142 infers relationships between different instructions based upon the scheduled instructions data and streams data of the compiled program 114.

In addition, the mapping module 142 can, based upon the processor layout, generate data indicating how compiled program data travels between stream registers along each stream over time. The mapping module 142 determines which data is in which stream registers at a given time, based on a timing at which the scheduled instructions 132 output data on the streams, the streams data 134 indicating on which streams each functional unit outputs data onto the same or different stream.

The conflict detection module 146 analyzes the mapped instructions and streams data generated by the mapping module 142, and determines whether any data conflicts exist between the mapped instructions and streams data. In some embodiments, a data conflict occurs when an instruction executed on a particular functional unit of the processor causes the processor to read data onto a stream during a same cycle when other data is being transmitted over the same portion of the stream (e.g., being stored to the same stream register along the stream), potentially overwriting the other data and causing a subsequent functional unit to receive erroneous data (e.g., data output onto the stream by the instruction, instead of the data that was previously being transmitted along the stream). The conflicts detection module 146 determines at which cycles data conflicts exist by determining, for each cycle of the program, which instructions are scheduled to output data onto which streams, based on the mapped instructions, and checking, using the streams data, whether any data is being transmitted along the same portion of the stream during the same cycle.

In some embodiments, the conflict detection module 146 detects timing errors between "producer" and "consumer" instructions. A timing error occurs when the compiler schedules instructions such that a timing between a first instruction configured to output data onto a stream (a "producer" instruction) and a second instruction configured to receive the data from the stream (a "consumer" instruction) is mismatched, such that the data arrives at the functional unit executing the second instruction earlier or later than the cycle during which the second instruction is configured to receive the data, causing the second instruction to receive incorrect data. The conflict detection module 146 compares the timing indicated by the scheduled instructions 132 and information in the compiled program 114 indicating the intended sources and/or destinations of data (such as information indicating which instruction is intended to consume data placed on a stream by a producer instruction) to identify the presence of any timing errors. The deterministic execution of the program by the processor enables the conflict detection module 146 to pre-calculate the timing and duration of any data conflicts that occur during execution of the program, without having to run the compiled program 114 beforehand, or relying on user-established breakpoints in the code.

The mapped instructions generated by the mapping module 142 and the data conflict information generated by the conflict detection module 146 are used to form a visualization model 148 for the compiled program 114. The visualization model 148 contains complete information regarding the layout of the processor, which functional units execute which instructions, the timing that the instructions are executed, the timing at which data travels across the streams of the processor, and the timing and duration of any data conflicts within the program. In some embodiments, the visualization module 148 reflects a cycle-by-cycle status of each functional unit and stream register of the processor.

In some embodiments, the visualizer 118 analyzes additional information when generating the visualization model 148. For example, in some embodiments, the visualizer 118 analyzes the static memory of the MEM units of the processor, by mapping, for each cycle, the amount and/or location of static memory in use. In some embodiments, the visualizer 118 determines which addresses of the memory are used by simulating garbage collection and inferring which data within the memory is no longer needed and can be 'freed'. In some embodiments, the visualizer 118 further identifies uses of memory that cause problems, such as superfluous writes in which data written to memory is never read out, write conflicts where data written to memory is overwritten by other data before it can be read, etc., similar to how the conflict detection module 152 detects stream-related data conflicts.

The visualization generation module 150 uses the visualization model 148 to generate one or more visualizations to be displayed to the user. In some embodiments, the visualizations are displayed on a user interface as one or more interactive diagrams that enable the user to analyze the timing and location of instructions and/or movement of data over streams during execution of the program (discussed in greater detail below). For example, as discussed above, in some embodiments, the visualizer 118 receives user input information from a user at the user device 102 (e.g., via the visualizer client 106). The visualization generation module 150 applies the received user input to a generated visualization to generate an updated visualization to be displayed to the user.

In some embodiments, the visualizer 118 transmits visualization model data to the user device 102, where the visualization is generated by the visualizer client 106 using the visualization model data. In some embodiments, certain user interactions with the visualization are handled by the visualizer client 106, while other user interactions are processed by the visualization generation module 150. For example, in some embodiments, the visualization generation module 150 generates visualization data for a particular view (discussed in greater detail below) that is transmitted to the visualizer client 106, wherein user interaction within the view is handled by the visualizer client 106.

Example Processor

Figure 2A:
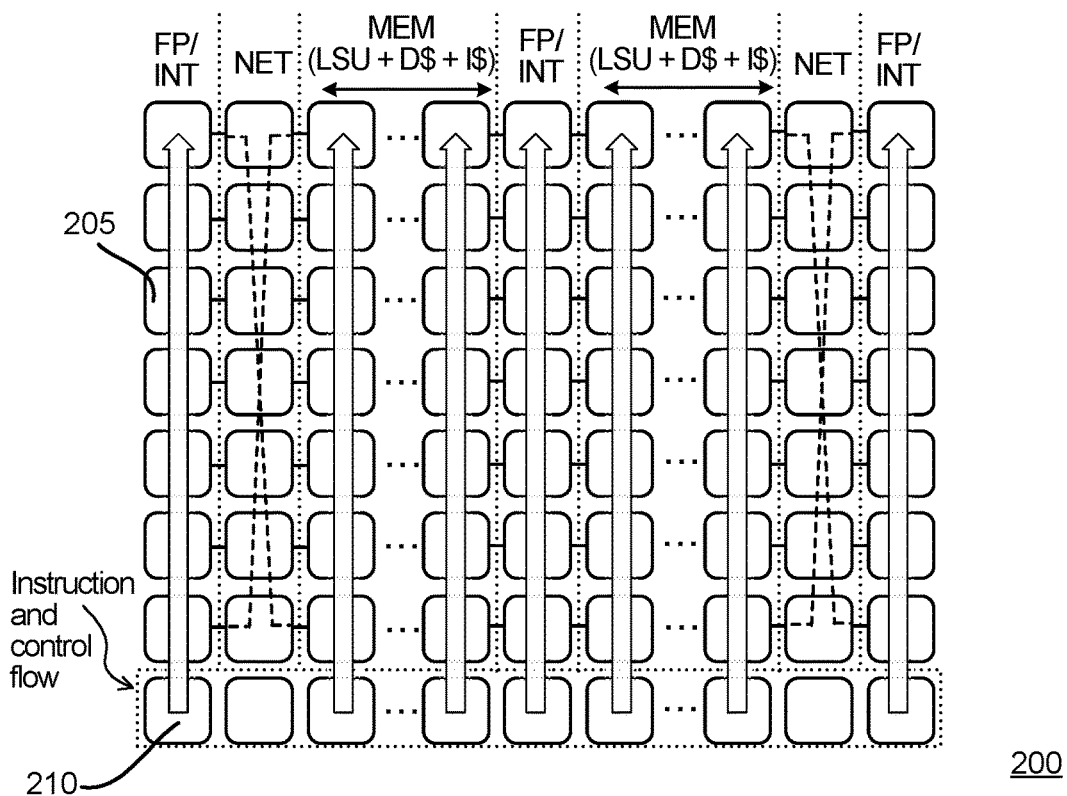
FIGS. 2A and 2B illustrate instruction and data flow in a processor having a functional slice architecture, in accordance with some embodiments.
Figure 2B:
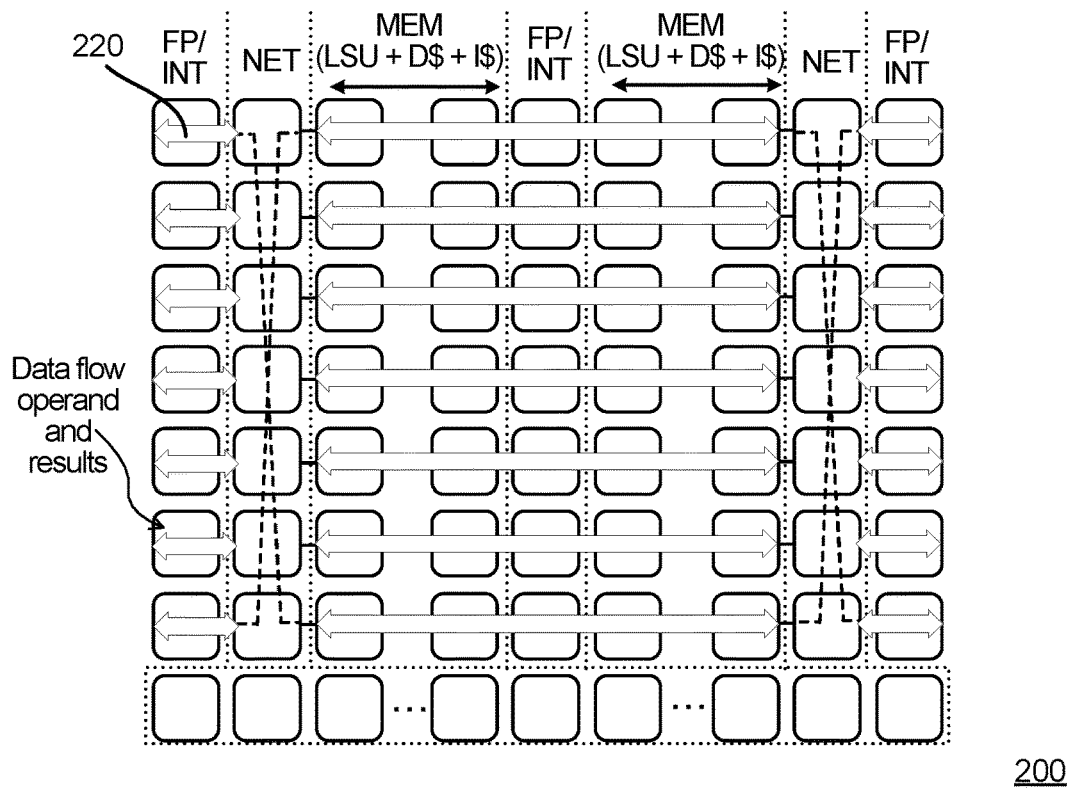

FIGS. 2A and 2B illustrate instruction and data flow in a processor having a functional slice architecture, in accordance with some embodiments. One enablement of processor 200 is as an application specific integrated circuit (ASIC), and corresponds to processor 120 illustrated in FIG. 1A associated with a corresponding processor model 148 illustrated in FIG. 1B.

The functional units of processor 200 (also referred to as "functional tiles") are aggregated into a plurality of functional process units (hereafter referred to as "slices") 205, each corresponding to a particular function type in some embodiments. For example, different functional slices of the processor correspond to processing units for MEM (memory), VXM (vector execution module), MXM (matrix execution module), NIM (numerical interpretation module), and SXM (switching and permutation module). In other embodiments, each tile may include an aggregation of functional units such as a tile having both MEM and execution units by way of example. As illustrated in FIGS. 2A and 2B, each slice corresponds to a column of N functional units extending in a direction different (e.g., orthogonal) to the direction of the flow of data. The functional units of each slice can share an instruction queue (not shown) that stores instructions, and an instruction control unit (ICU) 210 that controls execution flow of the instructions. The instructions in a given instruction queue are executed only by functional units in the queue's associated slice and are not executed by another slice of the processor. In other embodiments, each functional unit has an associated ICU that controls the execution flow of the instructions.

Processor 200 also includes communication lanes to carry data between the functional units of different slices. Each communication lane connects to each of the slices 205 of processor 200. In some embodiments, a communication lane 220 that connects a row of functional units of adjacent slices is referred to as a "super-lane", and comprises multiple data lanes, or "streams", each configured to transport data values along a particular direction. For example, in some embodiments, each functional unit of processor 200 is connected to corresponding functional units on adjacent slices by a super-lane made up of multiple lanes. In other embodiments, processor 200 includes communication devices, such as a router, to carry data between adjacent functional units.

By arranging the functional units of processor 200 into different functional slices 205, the on-chip instruction and control flow of processor 200 is decoupled from the data flow. Since many types of data are acted upon by the same set of instructions, what is important for visualization is visualizing the flow of instructions, not the flow of data. For some embodiments, FIG. 2A illustrates the flow of instructions within the processor architecture, while FIG. 2B illustrates the flow of data within the processor architecture. As illustrated in FIGS. 2A and 2B, the instructions and control flow flows in a first direction across the functional units of processor 200 (e.g., along the length of the functional slices 205), while the data flows in a second direction across the functional units of processor 200 (e.g., across the functional slices) that is non-parallel to the first direction, via the communication lanes 220 (e.g., super-lanes) connecting the slices.

In some embodiments, the functional units in the same slice execute instructions in a 'staggered' fashion where instructions are issued tile-by-tile within the slice over a period of N cycles. For example, the ICU for a given slice may, during a first clock cycle, issues an instruction to a first tile of the slice (e.g., the bottom tile of the slice as illustrated in FIG. 1B, closest to the ICU of the slice), which is passed to subsequent functional units of the slice over subsequent cycles. That is, each row of functional units (corresponding to functional units along a particular super-lane) of processor 200 executes the same set of instructions, albeit offset in time, relative to the functional units of an adjacent row.

Figure 3:
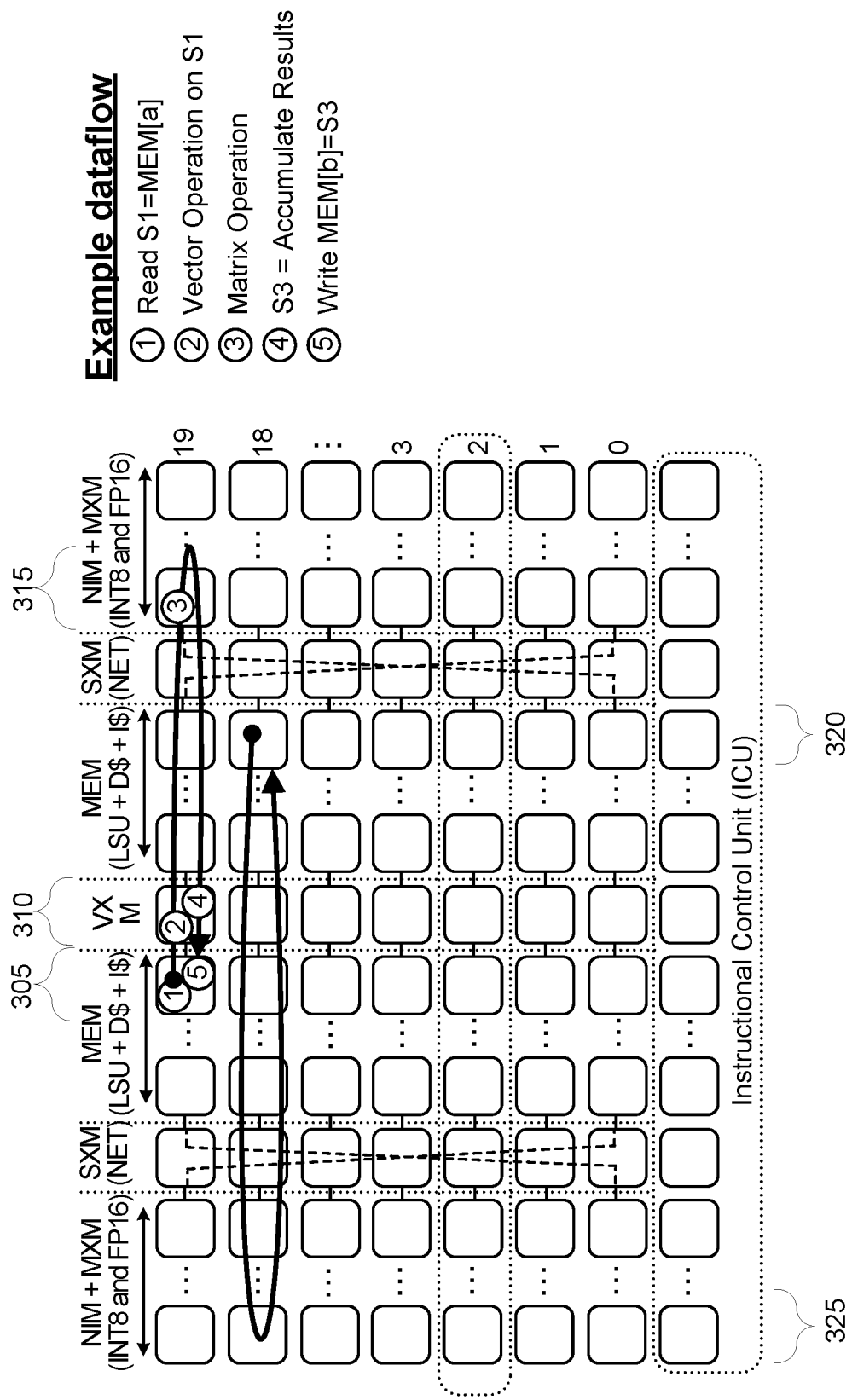
FIG. 3 illustrates an example of data flowing across the slices of a processor, in accordance with some embodiments.

FIG. 3 illustrates an example of data flowing across the slices of a processor, in accordance with some embodiments. As illustrated in FIG. 3, the functional slices of the processor are arranged such that operand data read from a memory slice is intercepted by different functional slices as the data moves across the chip, to produce results data that flows in the opposite direction where is then written back to memory. For example, as shown in FIG. 3, a first data flow comprising data read out from a first memory slice 305 flows in a first direction (e.g., towards the right), where it is intercepted by a VXM slice 310 that performs a vector operation on the received data. The data flow then continues to an MXM slice 315 which performs a matrix operation on the received data. The processed data then flows in a second direction opposite from the first direction (e.g., towards the left), where it is again intercepted by VXM slice 310 to perform an accumulate operation, and then written back to the memory slice 305.

In some embodiments, the functional slices of the processor are arranged such that data flow between memory and functional slices occur in both the first and second directions. For example, FIG. 3 illustrates a second data flow originating from a second memory slice 320 that travels in the second direction towards a second MXM slice 325, where the data is intercepted and processed by VXM slice 310 before traveling to the second MXM slice. The results of the matrix operation performed by the second MXM slice 325 then flow in the first direction back towards the second memory slice 320. Visualization of this bidirectional flow is useful to the user to improve the flow of instructions across the processor.

Figure 4:
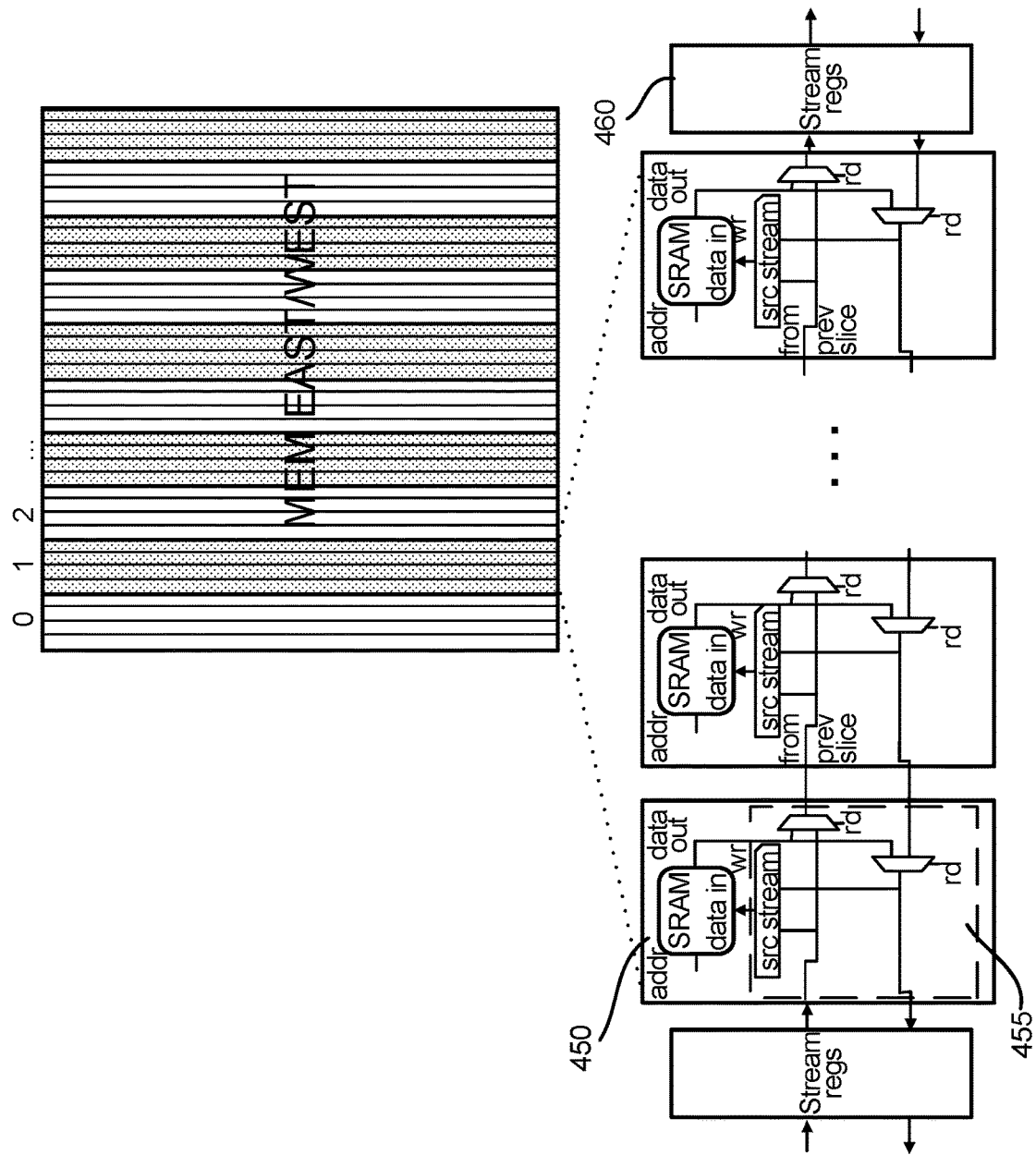
FIG. 4 is a diagram illustrating stream registers located along a super-lane of the processor, in accordance with some embodiments.

FIG. 4 is a diagram illustrating stream registers located along a super-lane of the processor, in accordance with some embodiments. The stream registers 460 are located between functional slices of the processor to facilitate the transport of data (e.g., operands and results) along each super-lane. For example, within the memory region of the processor, stream registers are located between sets of four MEM units 450. The stream registers 460 are architecturally visible to the compiler, and serve as the primary hardware structure through which the compiler has visibility into the program's execution. Each functional unit of the set contains stream circuitry 455 configured to allow the functional unit to read or write to the stream registers in either direction of the super-lane. In some embodiments, each stream register is implemented as a collection of registers, corresponding to each stream of the super-lane, and sized based upon the basic data type used by the processor (e.g., if the TSP's basic data type is an INT8, each register may be 8-bits wide). In some embodiments, in order to support larger operands (e.g., FP16 or INT32), multiple registers are collectively treated as one operand, where the operand is transmitted over multiple streams of the super-lane. All of these functional features-superlanes of functional units, slices of instruction flow, handling of different types of integers and floating point number, occurring trillions of times a second, are very difficult for a programmer to visualize without the embodiments disclosed herein.

Visualization Interface

Figure 5:
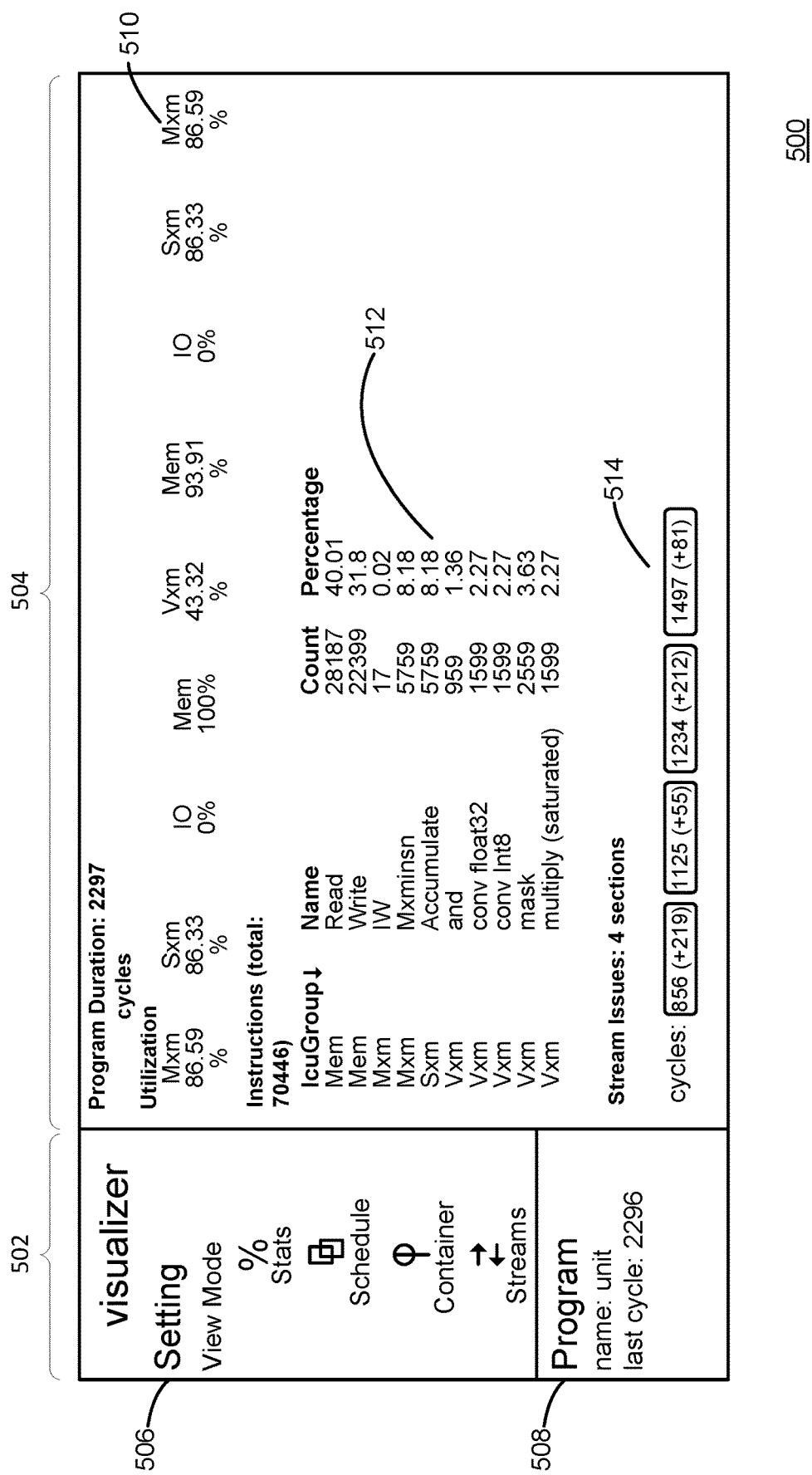
FIG. 5 illustrates a visualization interface that may be generated by the visualizer, in accordance with some embodiments.

For some embodiments, FIG. 5 illustrates a visualization interface that is generated by the visualizer. In some embodiments, the visualization interface is displayed to the user at the visualizer client 106 illustrated in FIG. 1A. In some embodiments, the visualization model generated by the visualizer is used to visualize data and instructions on a single super-lane of the processor during runtime of the selected program. As discussed above in relation to FIGS. 2A and 2B, the functional units along each super-lane of the processor execute the same set of instructions in a temporally staggered manner. As such, a visualization of a single super-lane of the processor, which represents a cross-section of all the functional slices on the processor, can be extrapolated to the overall processor.

As depicted in FIG. 5, the visualization interface 500 comprises a sidebar 502 and a primary display portion 504. The sidebar 502 contains a Settings portion 506 for a selectable interface enabling the user to select different types of visualizations to be displayed within the primary display portion 504. For example, the user selects between a statistics view ("Stats"), a schedule view ("Schedule"), a container view ("Container"), and a streams view ("Streams"). In addition, the sidebar 502 includes an Information portion 508 configured to display information relating to a currently selected program or instruction (described in more detail below). For example, as illustrated in FIG. 5, the Information portion 508 displays a name and number of cycles of a currently selected program.

The primary display portion 504 is configured to display information based on the current view selected by the user. For example, in the "Stats" view illustrated in FIG. 5, the primary display portion displays utilization information 510, instructions information 512, and issues information 514. In some embodiments, the utilization information 512 indicates a percentage of functional units of various regions of the processor that are used during runtime of the selected program. The utilization information indicates regions of different types of functional units of a super-lane (e.g., from left to right), and a percentage of functional units within each region that are used during runtime of the program. For example, as illustrated in FIG. 3, in some embodiments, the processor has a central VXM portion, and mirrored sub-regions comprising MEM, SXM, and MXM. Other types of utilization may include memory utilization, super-lane utilization, power utilization, instruction queue utilization.

The instructions information 512 indicates a total number of instructions and a breakdown of the different types of instructions within the selected program. For example, as shown in FIG. 5, instructions processed by MEM units may include Read, Write, and Initialize Weights (IW) instructions.

The issues information 514 indicates a timing and duration of any issues detected within the selected program. For example, as discussed above, as part of generating the visualization model 148 for the selected program, the conflict detection module 146 analyzes the instructions of the program to identify any data conflicts. In some embodiments, detected data conflicts are grouped into sections, where each section corresponds to a continuous sequence of cycles where data conflicts are present. For example, as illustrated in FIG. 5, the issues section displays information pertain to four sections, each section associated with a respective start cycle and a cycle duration amount (e.g., a first section that starts at cycle 586 of the program and persists for 219 cycles). Because execution of the compiled program 115 on the processor 120 is deterministic, the conflict detection module 146 is able to determine at which cycles in the program these data conflicts occur using the scheduled instructions and streams data of the compiled program 114 mapped by the mapping module 142 onto a model of the processor 120, without having to execute the compiled program 114 on the processor 120.

Schedule View Interface

Figure 6A:
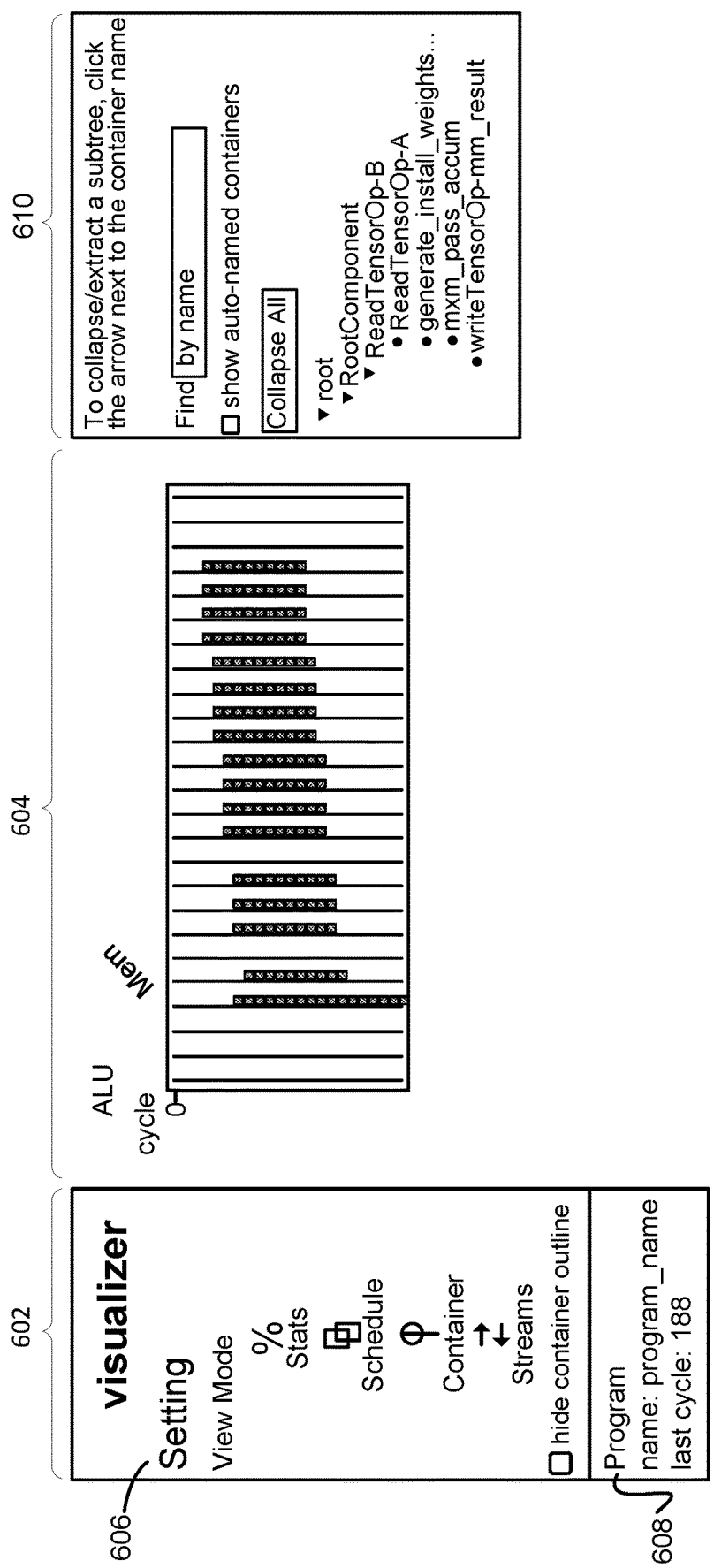
FIGS. 6A and 6B illustrate examples of a schedule view interface that may be displayed by the visualizer, in accordance with some embodiments.
Figure 6B:
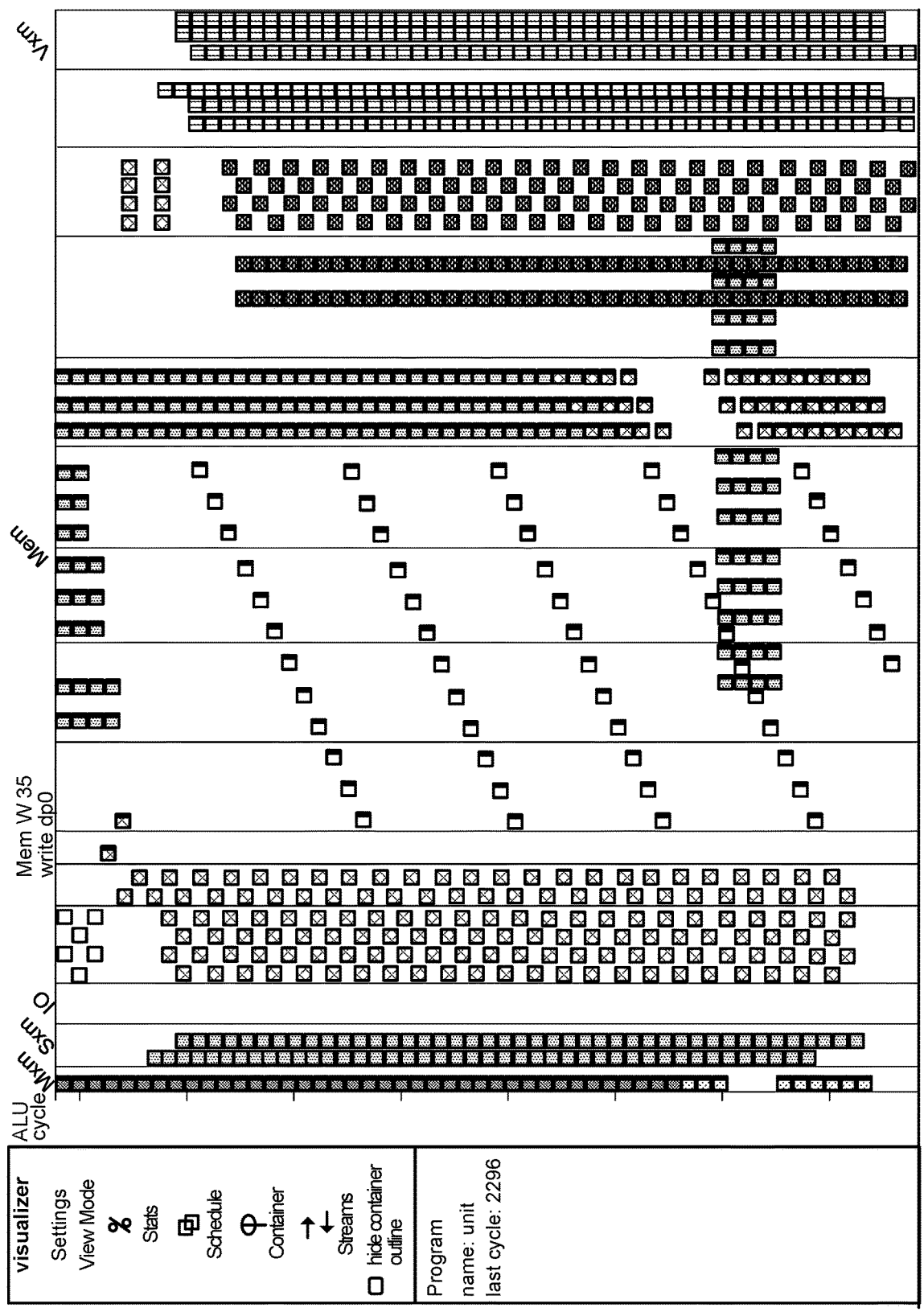

FIGS. 6A and 6B illustrate examples of a schedule view interface that is displayed by the visualizer, in accordance with some embodiments. As illustrated in FIG. 6A, the visualizer displays a sidebar 602 that includes a settings portion 606 and an information portion 608 (similar to that shown in FIG. 5), a primary display portion 604, and an outline portion 610.

In Schedule view, the primary display portion 604 displays a timeline showing instruction-level scheduling and where in the processor each instruction occurs in time. For example, as illustrated in FIG. 6A, the x-axis of the timeline corresponds to the functional units of a super-lane of the processor, while the y-axis corresponds to time (e.g., number of cycles). The schedule view represents each instruction of the program as a block on the timeline, where the horizontal position of the block indicates which functional unit of the super-lane executes the instruction, while the vertical position of the block indicates a cycle during which the instruction begins execution. In some embodiments, the block corresponding to a given instruction indicates the first cycle in which execution of the instruction begins, and that certain instructions may execute over multiple cycles. Different types of instructions are indicated using different colors to create greater visual contrasts for the user. For example, FIG. 6A illustrates a plurality of read instructions executed by MEM units of the super-lane, displayed as blocks of a first color (e.g., orange) or shading. For example, FIG. 6B illustrates a more zoomed out view of the timeline, showing instructions executed by different functional units of the super-lane during runtime of the application, where different types of instructions corresponding to blocks with different coloring or shading (e.g., orange for read instructions, teal for write instructions, by way of example). This allows a user to quickly gain a high level view of which functional units of the processor are responsible for which instructions, and when these instructions are executed. The colors/shading help a user to identify regions and/or time periods of over-utilization or under-utilization of functional units, and adjust the program accordingly. In some embodiments, the schedule view visualization, is used by a user as part of a visual coding tool, the user manually changes the scheduling of instructions in the compiled program in order to optimize timing.

As discussed above (e.g., in relation to FIG. 3), data is processed by a series of instructions, in which the data is read from memory onto one or more streams of the super-lane, processed by one or more functional units (e.g., VXM, MXM, etc.), and written back into memory (e.g., at the same or a different functional unit along the super-lane). In some embodiments, blocks representing instructions executed by MEM units (e.g., read or write instructions) are displayed with a black bar or other visual indication on one side, indicating that the instruction serves as a start or end point for data traveling through the super-lane, and a direction in which the data travels. For example, a block corresponding to a read instruction with a bar on the left side indicates that the instruction serves as a start point for data being placed onto a super-lane to be processed by one or more other functional units, and that the data, when first read onto the super-lane, travels away from the starting location.

Figure 7:
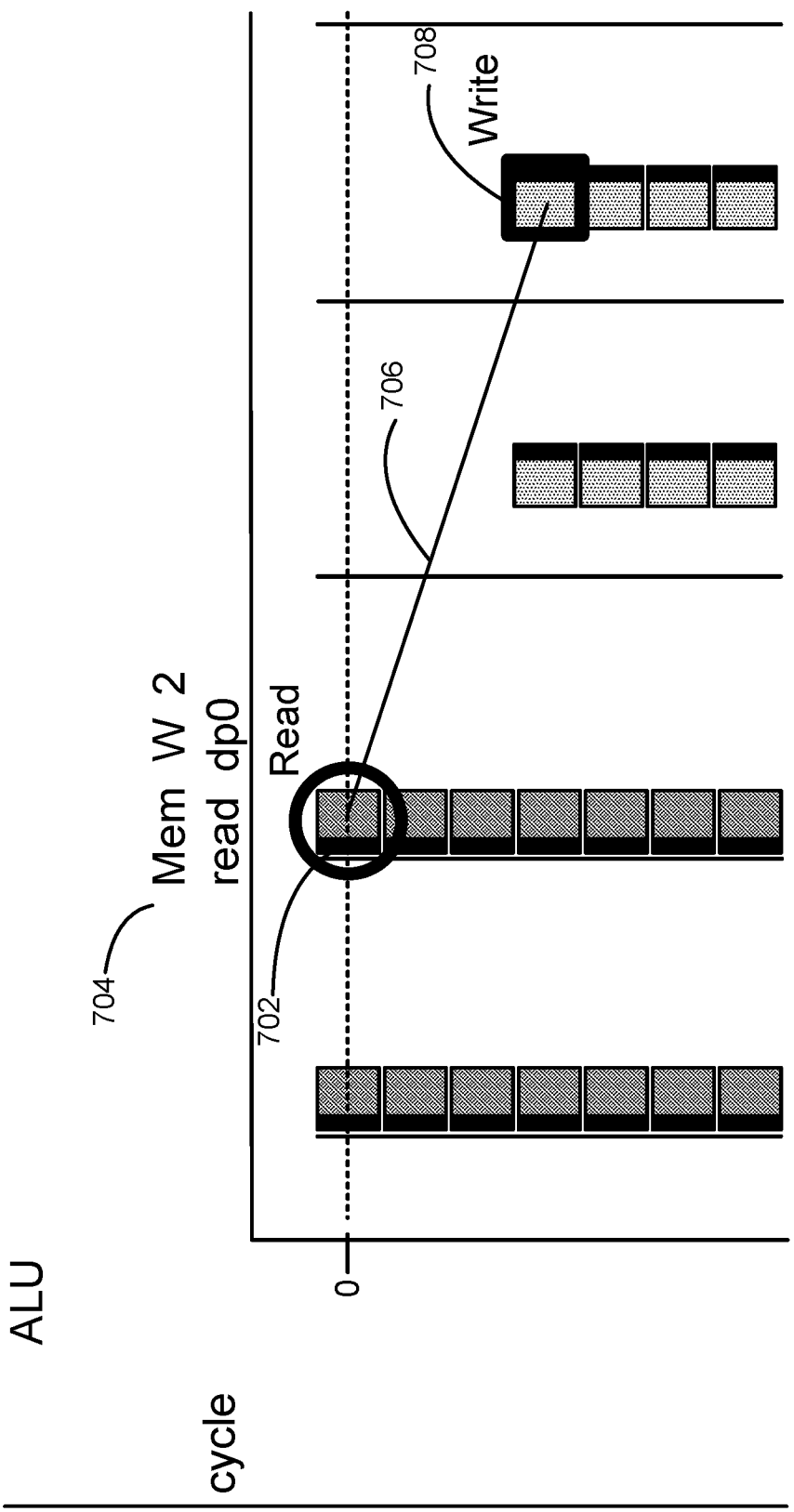
FIG. 7 illustrates a portion of the schedule view interface when the user selects a block corresponding to an instruction, in accordance with some embodiments.

In some embodiments, the user selects one or more of the displayed blocks to obtain additional information relating to the instructions corresponding to the selected blocks. FIG. 7 illustrates a portion of the schedule view interface when the user selects a block corresponding to an instruction, in accordance with some embodiments. As shown in FIG. 7, when the user selects an instruction, e.g., an instruction corresponding to a read operation 702, information 704 corresponding to the instruction is displayed on the timeline, e.g., indicating that the instruction is a read instruction that is executed by a particular MEM unit (e.g, MEM unit W 2, corresponding to a second MEM unit in another region of the processor). In addition, a path 706 indicating a next destination of the data associated with the read instruction is displayed, indicating that the data is processed by a write instruction 708 several cycles later at another MEM unit of the super-lane.

Figure 8A:
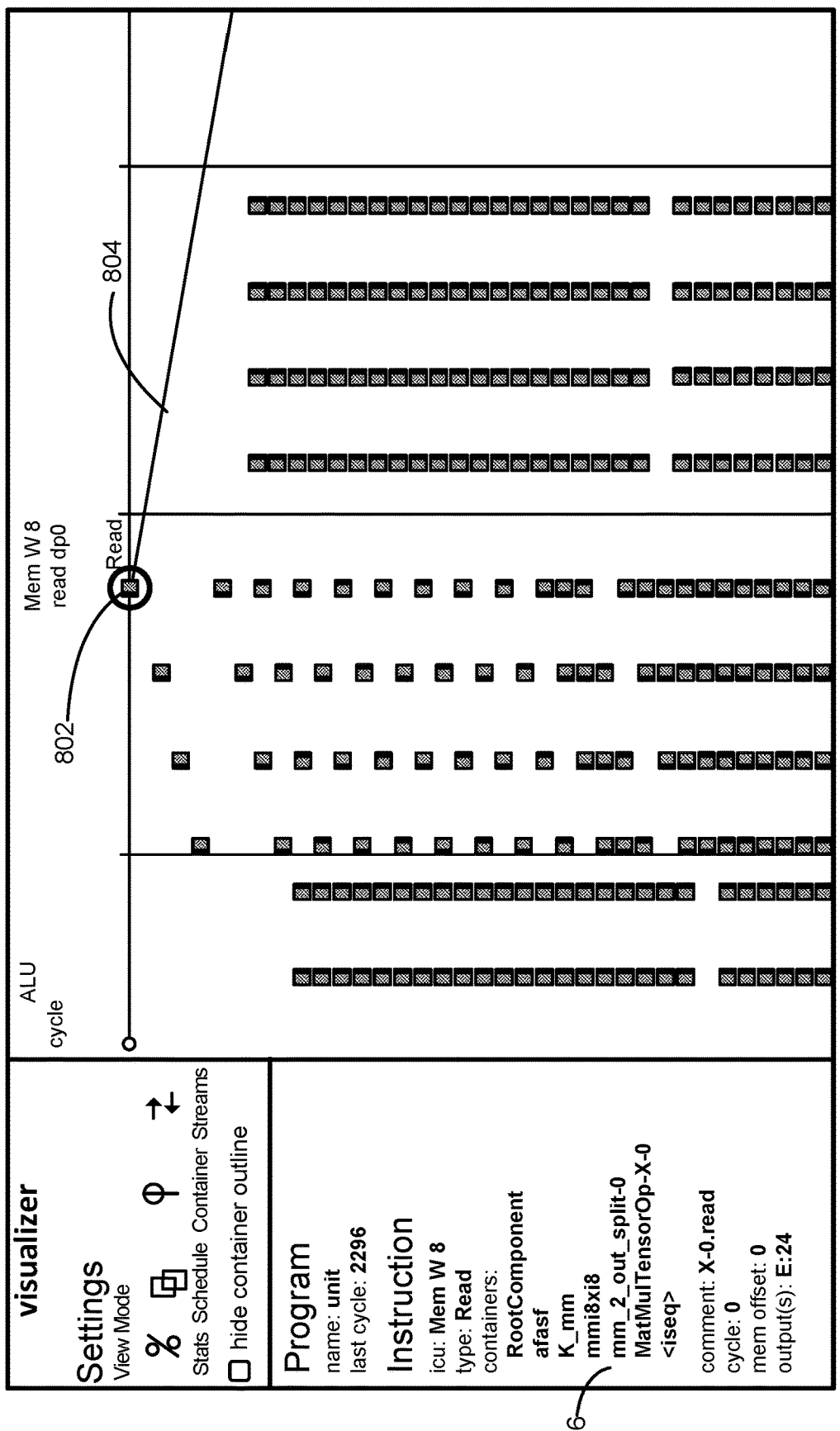
FIGS. 8A-8D illustrate another example of the visualizer interface displaying how data travels through the super-lane of the processor, in accordance with some embodiments.
Figure 8B:
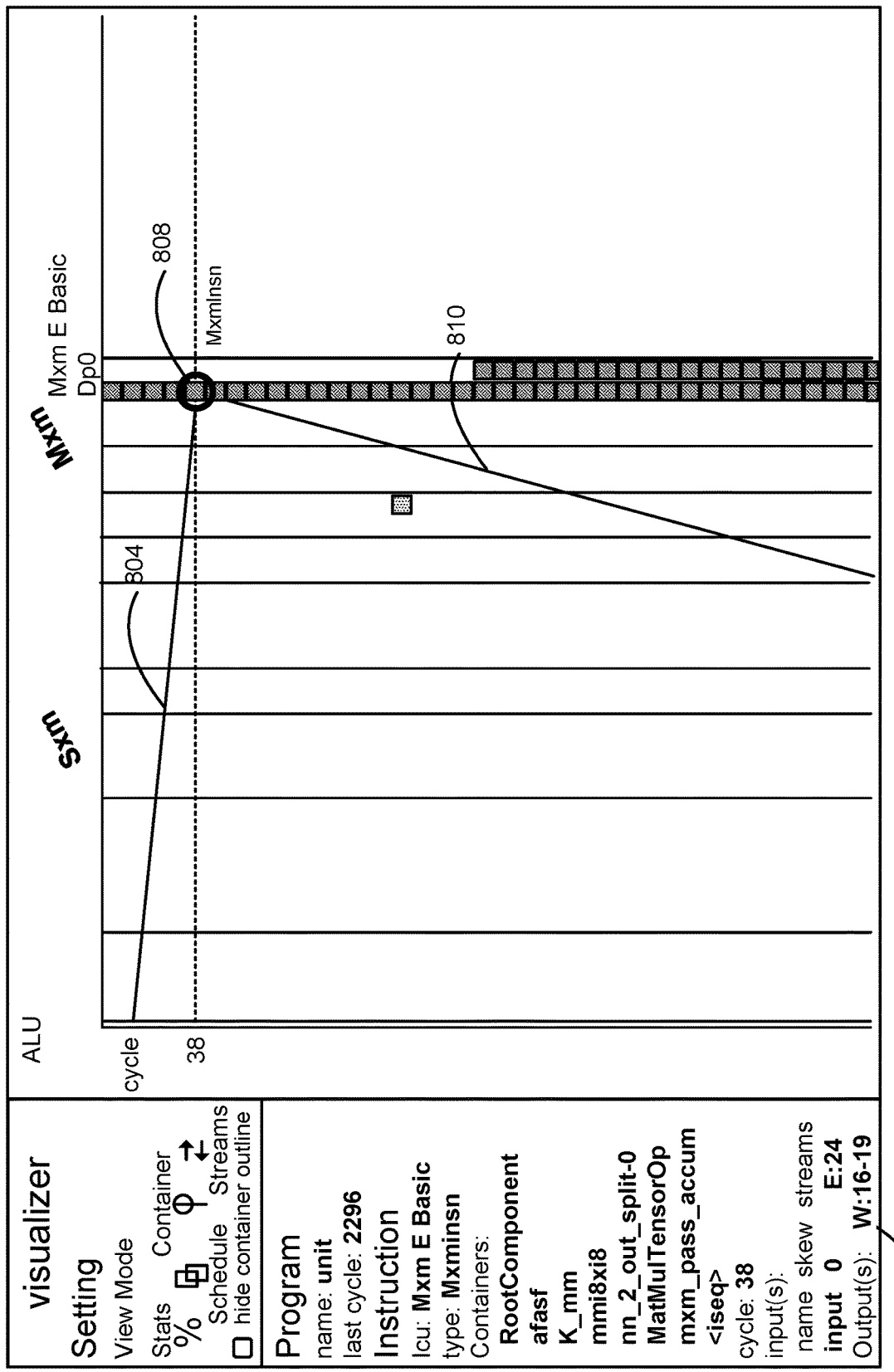

In some embodiments, data is processed by a number of different instructions at different functional units before being written back into memory. FIGS. 8A-8D depict another example of the visualizer interface displaying how data travels through the super-lane of the processor, in accordance with some embodiments. As shown in FIG. 8A, responsive to the user selecting a read instruction 802, a path 804 is displayed indicating a path of the data read onto the super-lane by the MEM unit executing the read instruction. In addition, in some embodiments, the instructions portion 806 of sidebar displays, in addition to program information (previously discussed in relation to FIG. 5), instruction information corresponding to the selected instruction, e.g., instruction type, the functional tile executing the instruction, containers that the instruction is part of (to be discussed in greater detail below), the cycle during which execution of the instruction begins, a memory offset indicating a memory address corresponding to the data associated with the instruction, output stream onto which the read data is output. FIG. 8B illustrates the visualizer displaying that the data associated with the selected read command is transmitted to and consumed by an MXM unit at a later cycle (e.g., cycle 38), which executes an Mxmlnsn instruction 808 on the received data. In addition, the visualizer displays a path 810 corresponding to the data output onto the super-lane by the MXM unit following execution of the instruction. When the user selects the instruction 808 performed at the MXM unit, information corresponding to the instruction is displayed in the sidebar 806, e.g., indicating that the input data for the instruction was received via the E24 stream, while the data output by the instruction is transmitted along multiple other streams (W16-19).

Figure 8C:
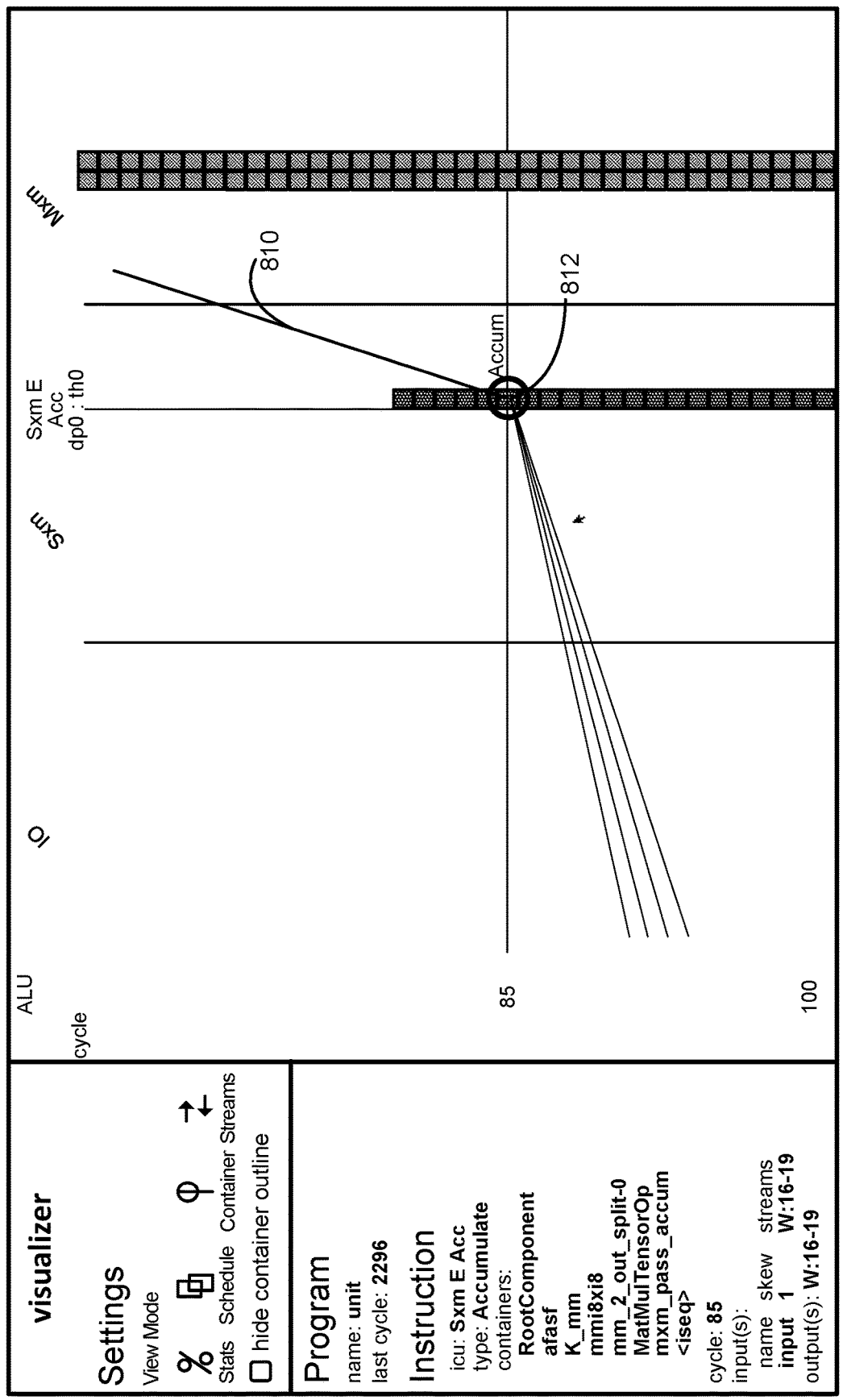
Figure 8D:
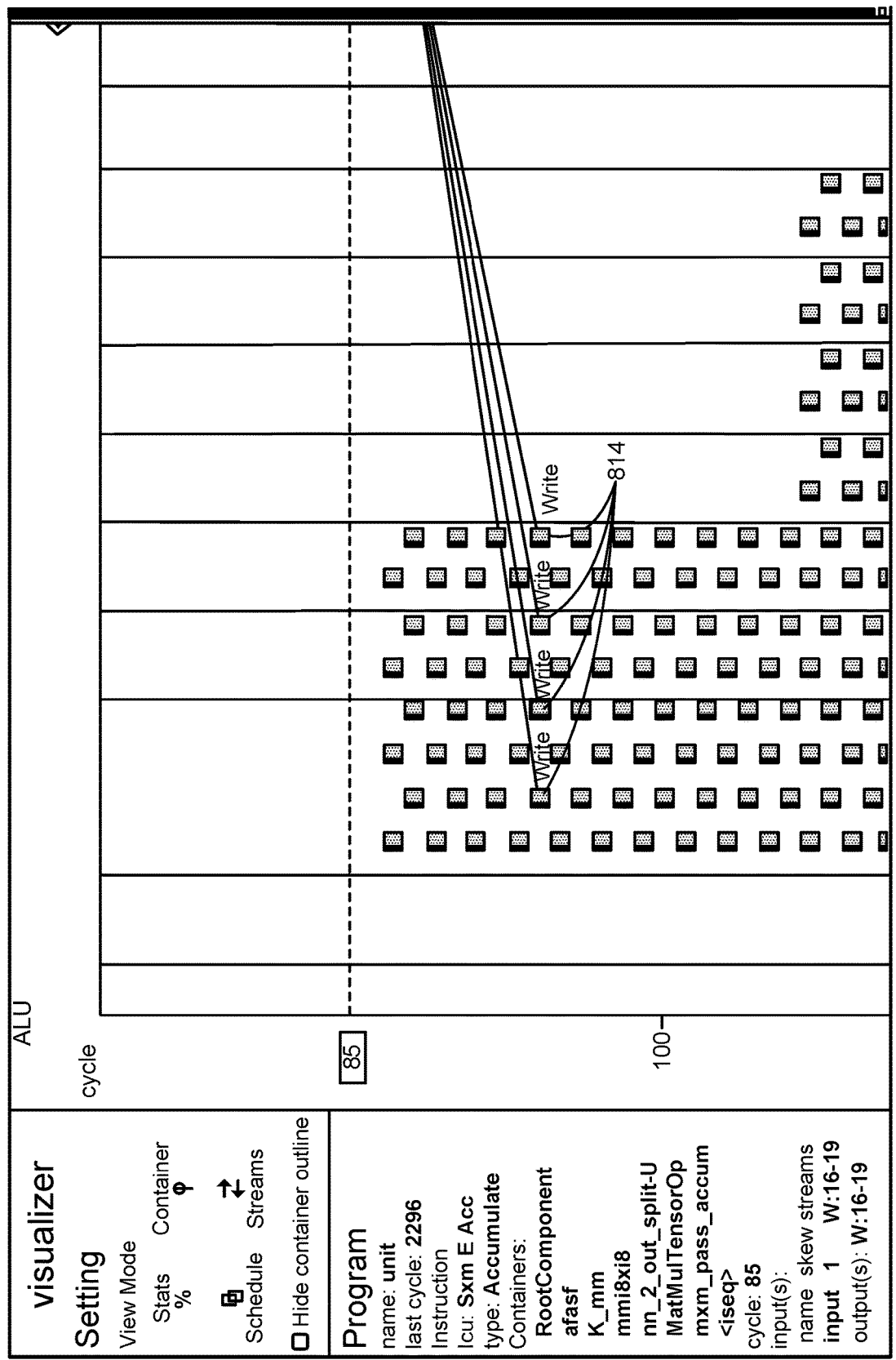

FIG. 8C illustrates that the data output by the MXM unit travels to and is consumed by an SXM unit which performs an accumulate instruction 812 on the received data. In addition, the accumulate instruction 812 performed by the SXM unit produces output data that is output over multiple streams of the super-lane (e.g., 4 lanes, W16-19) to be processed by multiple different downstream functional units (e.g., written to memory at four different MEM units by four different write instructions 814), as shown in FIG. 8D. In some embodiments, the schedule view interface displayed by the visualizer, responsive to a user selecting a particular instruction, displays the entire path of data associated with the instruction, from when the data is first read onto a lane of the super-lane at one or more source MEM units, to when the data is written back into memory at one or more destination MEM units. The user sees at a glance how a particular piece of data is read, operated upon, and written back into a memory of the processor.

Figure 9:
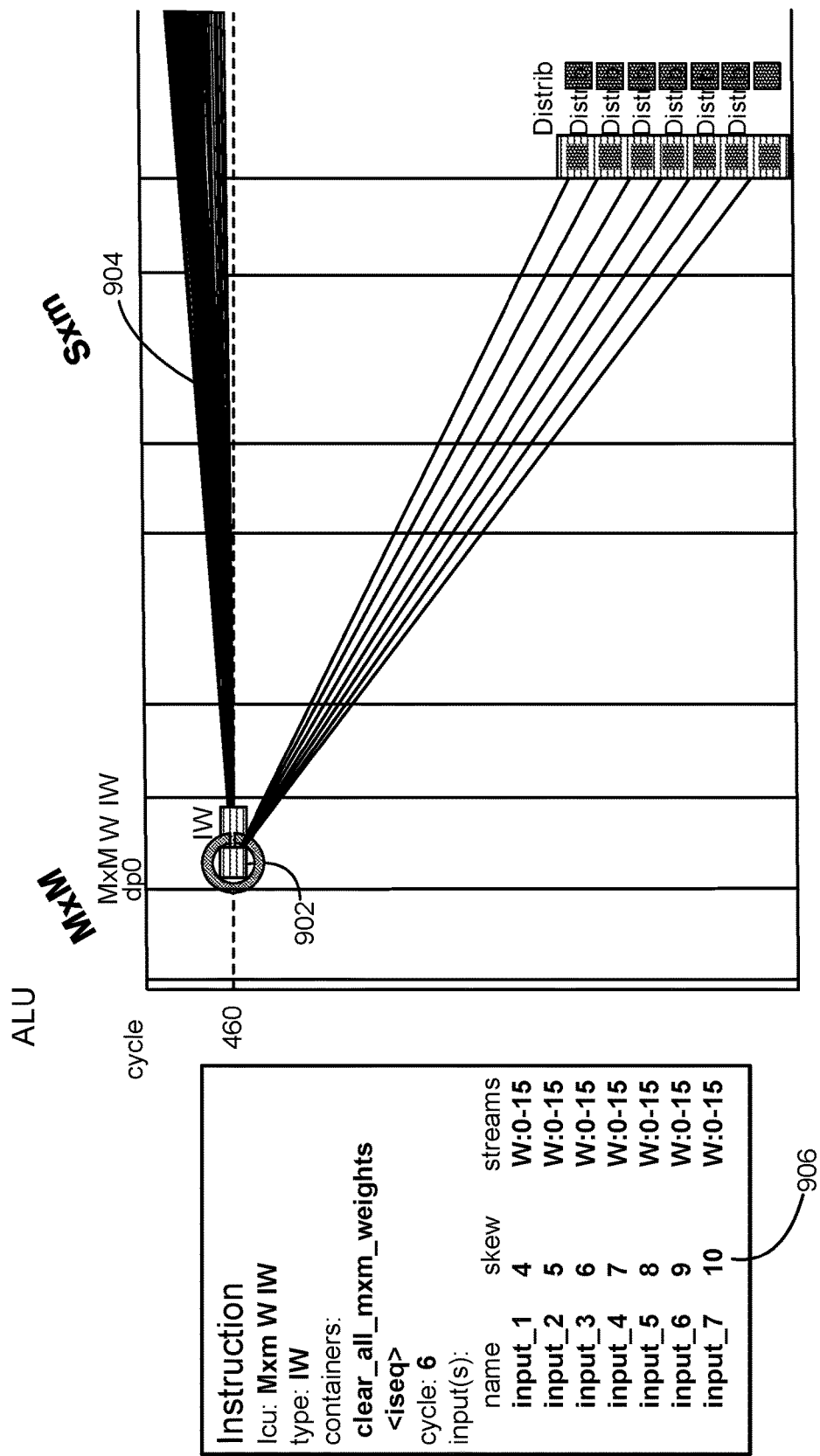
FIG. 9 illustrates an example of the schedule view interface of the visualizer displaying information corresponding to an initialize weights instruction, in accordance with some embodiments.

For some embodiments, FIG. 9 illustrates an example of the schedule view interface of the visualizer displaying information corresponding to an initialize weights instruction. In some embodiments, an instruction to initialize weights is executed by a prediction model program in order to load weight values stored in the memory of the processor onto one or more MXM units, to be used for processing later operands. As illustrated in FIG. 9, responsive to the user selecting the block 902 corresponding to the initialize weights instruction at a specific MXM unit, the visualizer displays paths 904 between the instruction on the MXM unit onto which the weights are initialized and instructions executed on MEM units of the super-lane reading the weights data onto the super-lane, allowing the user to quickly discern which read instructions on which MEM units are associated with the initialize weights instruction. In addition, the sidebar 906 displays information of the initialize weights instruction, e.g., indicating which inputs (e.g., weight values) are received by the MXM unit and a timing at which the inputs are received (e.g., as indicated by skew values, which correspond to a number of cycles after the instruction begins that the MXM unit receives inputs).

As discussed above, some instructions execute over multiple cycles, depending upon the hardware of the processor. For example, even if a read instruction begins execution on a certain cycle, the data associated with the read instruction is not read out until several cycles later. Similarly, while an initialize weights instruction, such as the instruction 902 illustrated in FIG. 9, begins execution on a certain cycle (e.g., cycle 6), the actual weight data values from the MEM units is received over a number of later cycles (e.g., as indicated by the skew values shown in sidebar 906). In some embodiments, instructions are displayed as blocks at locations in the timeline corresponding to the first cycle of the instruction, and paths indicating data output by the instruction onto a stream and/or received by the instruction along a stream beginning or ending at the displayed blocks. As such, the visualizer shows path lines corresponding to data transmitted over the super-lane received by the MXM unit associated with the initialize weights instruction beginning at cycle 6, even though the actual data may be received during later cycles. In some embodiments, this appears to show data being read onto a stream by a read instruction at a MEM unit during a cycle later than the cycle at which the data appears to be received by the initialize weights instruction (e.g., data from a read instruction that begins after cycle 6), although it is understood that in reality, the data is not received at the MXM unit until a later cycle. This is consistent with the importance for the visualizer to visualize the instruction flows more than the data flows.

In some embodiments, the visualizer is configured such that when the user selects a block corresponding to an instruction that is executed over multiple cycles, the displayed block expands to indicate the range of cycles over which the instruction is executed, and the paths connected to the block indicating data received by or transmitted from the tile corresponding the instruction are adjusted to indicate the cycle during which the data is actually received or transmitted.

Containers and Container View Interface

In some embodiments, a data structure referred to as a 'container' comprises a subset of the instructions of a compiled program. For example, a user writing a program specifies different containers into which various instructions are organized. Each container corresponds to a subroutine or module (for example, a subroutine for multiplying a vector by a matrix), and the containers are organized in a hierarchical structure, where containers only comprise instructions, or comprise instructions and other containers. In some embodiments, the compiler also creates and auto-names certain containers (for example, when the compiler detects a call to a subroutine in a library of known subroutines). For example, referring back to FIG. 6A, the outline portion 610 of the displayed interface displays a nested outline of containers within the selected program.

Figure 10:
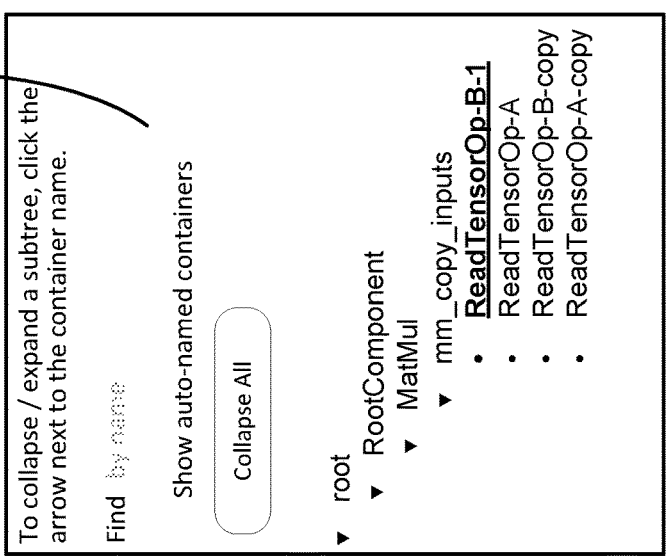
FIG. 10 illustrates another example of the schedule view interface having an outline portion displaying a nested outline of containers within the selected program, in accordance with some embodiments.
Figure 10:
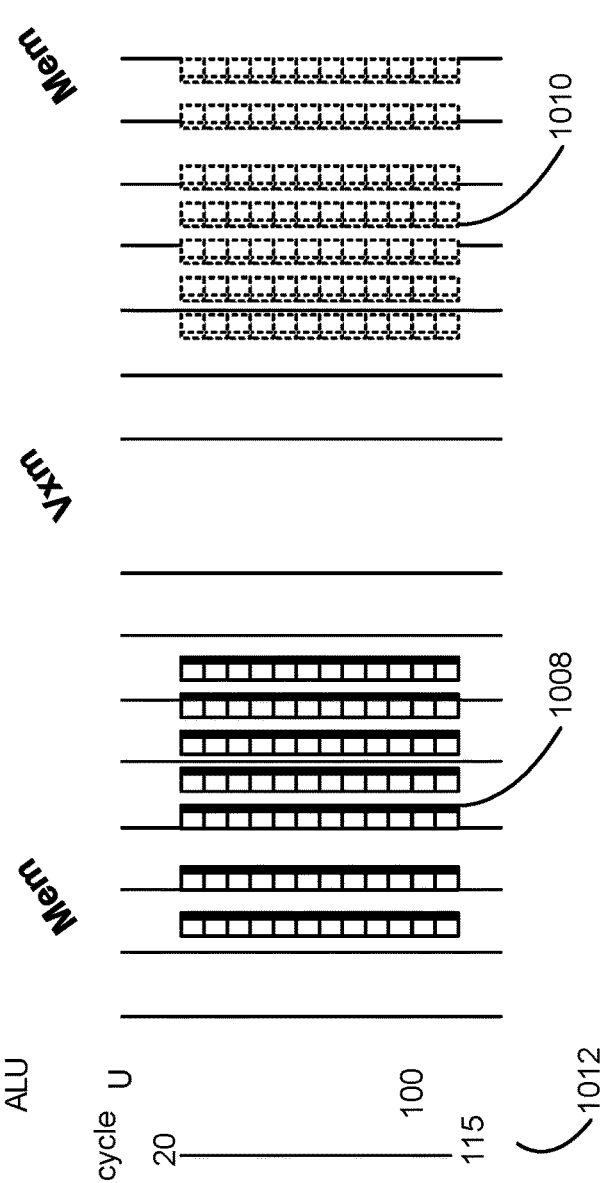

FIG. 10 illustrates another example of the schedule view interface having an outline portion displaying a nested outline of containers within the selected program, in accordance with some embodiments. Each nested container within the outline portion 1002 can be expanded or collapsed individually. In addition, the user can search for specific containers by name using the find field 1004.

In addition, when the user selects a container from the nested outline, the visualizer is configured to display information indicating which instructions, from one or more functional units, the selected container is associated with. This helps highlight the functional relationship of the instructions. In some embodiments, the user selects a container simply by hovering a cursor over the name of the container in the outline portion 1002. The user can click the cursor on a specific container and/or select multiple containers.

When the user selects a container, the timeline displayed in the primary display portion of the visualizer is updated to indicate which instructions in the timeline are associated with the selected container. For example, in FIG. 10, instructions 1008 are associated with the selected container, and are displayed normally or highlighted, while other instructions 1010 that are not part of the selected container are grayed out. In addition, the visualizer may display a cycle indicator 1012 along the y-axis of the displayed timeline, indicating a range of cycles associated with the instructions of the container (e.g., showing a range of cycles from a starting cycle of a first instruction of the container to a starting cycle of a last instruction of the container). By allowing the user to focus on specific containers, the user can analyze how the instructions of each container are scheduled, determine which regions of the processor the instructions associated with the container operate on, over which cycles with the program's runtime are the instructions associated with the container scheduled, etc.

Figure 11:
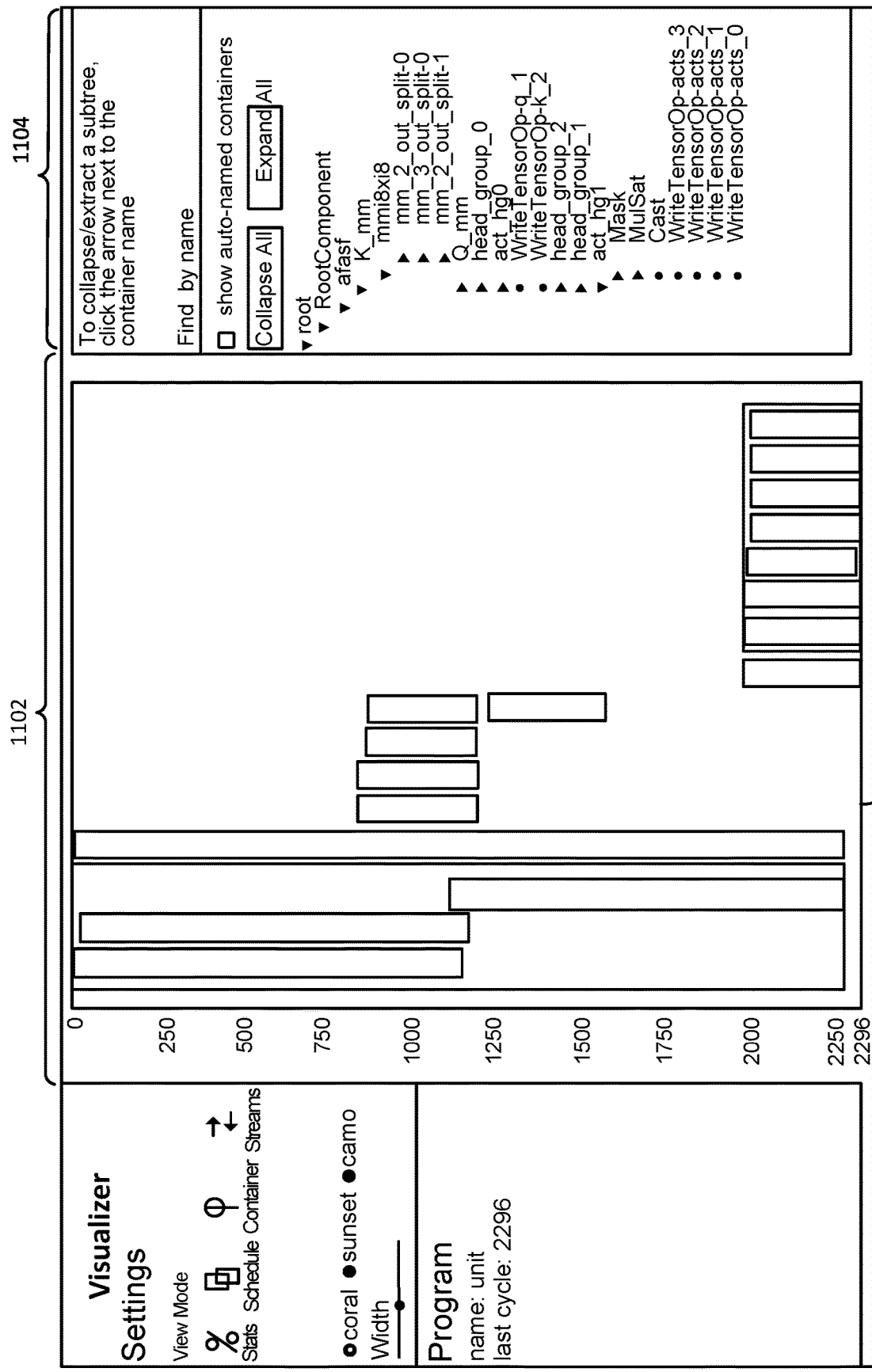
FIG. 11 illustrates an example of a container view interface that may be displayed by the visualizer, in accordance with some embodiments.

In some embodiments, the visualizer provides a container view allowing the user to view the hierarchy of containers and their temporal relationships. FIG. 11 illustrates an example of a container view interface that is displayed by the visualizer, in accordance with some embodiments. As shown in FIG. 11, the primary display portion 1102 of the visualizer interface displays a timeline (where time in cycles is displayed on the y-axis) containing a number of nested rectangles, each rectangle representing a container. Rectangles nested within a container correspond to other containers within the container. For example, in a program where all instructions are part of a "root" container, the root container 1106 in the container view of the visualizer interface is displayed to span over all cycles of the program's runtime, and encompass all other containers within the program. The height and vertical placement of each rectangle corresponds to a timing of its corresponding container. For example, the top of the rectangle aligns with a cycle corresponding to a first instruction within the container (either directly or within one of its descendent containers), while the bottom of the rectangle aligns with a last instruction within the container. This allows the user to easily discern the relative timing of instructions associated with different containers.

In some embodiments, the user selects certain containers (e.g., within the outline portion 1104), whereupon the primary display portion is updated to highlight the selected container(s) (e.g., by brightening the rectangles associated with the selected container and any descent containers, and/or greying out rectangles for all other containers). This creates greater visual contrasts for the user.

Streams View Interface

In some embodiments, the visualizer displays a streams view interface that provides a view of the flow of data within the processor at various points in time during runtime of the program, and helps a user identify potential conflicting use of streams. As discussed above, each super-lane of a process provides a plurality of streams for data movement.

Figure 12:
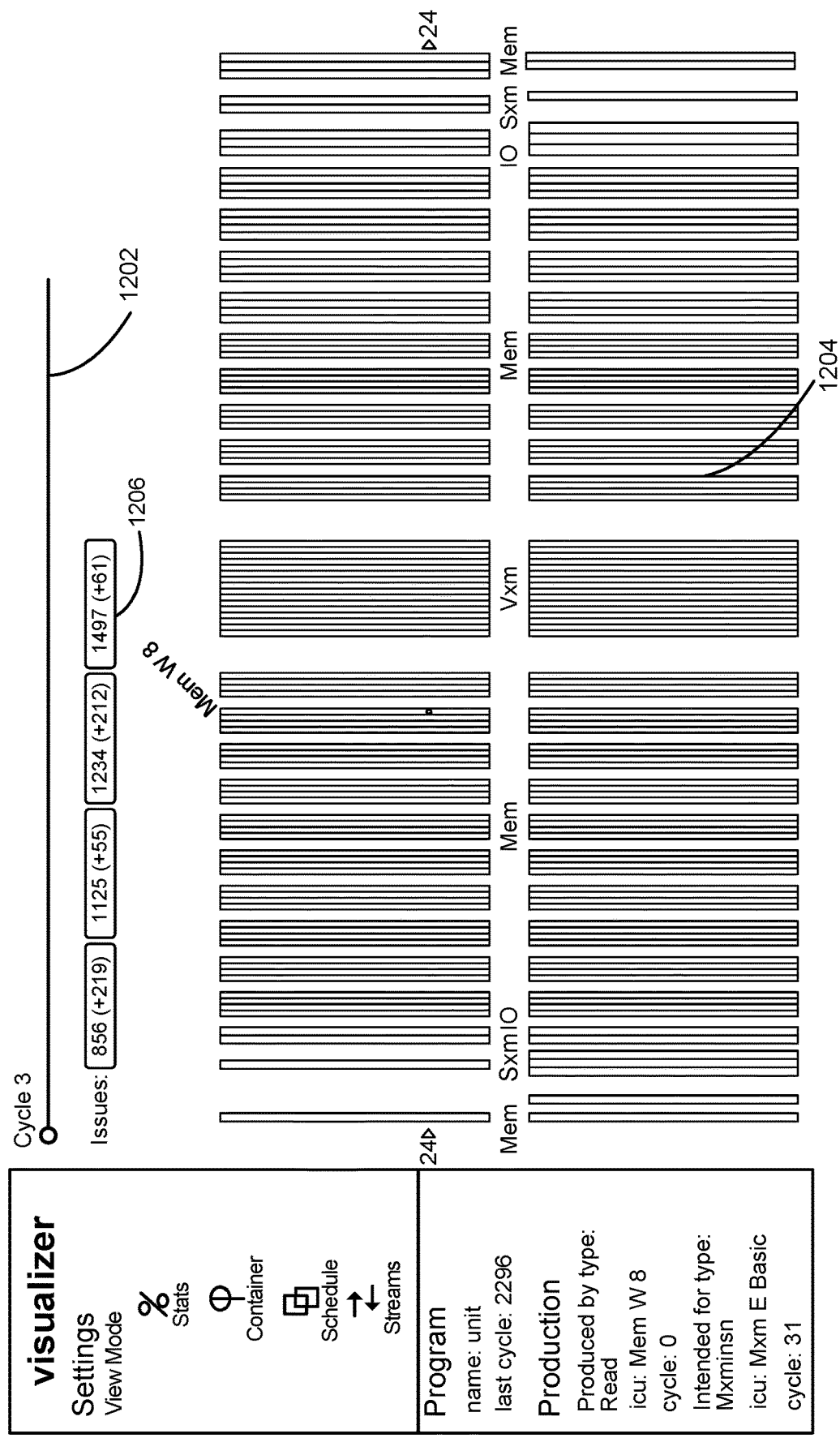
FIG. 12 illustrates an example of a streams view interface that may be displayed by the visualizer, in accordance with some embodiments.

For some embodiments, FIG. 12 illustrates an example of a streams view interface that are displayed by the visualizer. The streams view interface displayed in the primary display portion of the visualizer includes a cycle slider 1202, a streams diagram 1204, and an issues display 1206.

The cycle slider 1202 is a graphical interface control component (e.g., a slider bar) that allows the user to select a specific cycle in the program. In some embodiments, the user enters a specific cycle to observe a state of the streams at the selected cycle, or step forward through the program to observe how the state of each stream changes as the program is executed. Because the compiler schedules the instructions of the compiled program to be executed by the processor in a deterministic manner, the mapping module 142 and conflict detection module 146 are able to infer the location of data traveling through the processor during each cycle, allowing for the user to select any arbitrary cycle to view using the visualizer, without the need to place breakpoints at predetermined points within the program beforehand.

The streams diagram 1204 shows the functional units that are traversed by each stream. In some embodiments, the functional units are divided into two halves where functional units are traversed by different streams. In some embodiments, the streams diagram 1204 shows gaps between groups of functional units (e.g., within the memory regions, a gap is shown between groups of four memory units), which correspond to locations of one or more stream registers positioned between the displayed functional units. In the embodiment illustrated in FIG. 12, the stream registers are not shown when no data is being stored within. In other embodiments, the visualizer displays the stream registers even when no data is being transmitted through the streams.

In addition, as shown in FIG. 12, in some embodiments, some functional units are accessible to streams traveling in a first direction but not a second direction, and as such only appear in portions of the stream diagram corresponding to the first direction (or vice versa). In FIG. 12, during cycle 3 the streams can be devoid of content, and so no streams are visible in the streams diagram 1204.

The issues display 1206 is similar to the issues information 514 described in relation to FIG. 5, and indicates a timing and duration of any issues detected within the selected program (e.g., data conflicts detected by the conflicts detection module 146). The detected issues are grouped into sections corresponding to a continuous sequence of cycles where issues (e.g., data conflicts) are present.

Figure 13A:
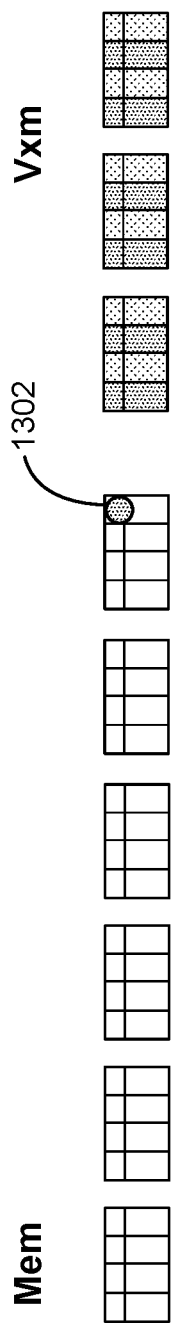
FIGS. 13A-13C illustrates examples of how stream activity for a particular stream may be displayed in the streams view interface, in accordance with some embodiments.
Figure 13B:
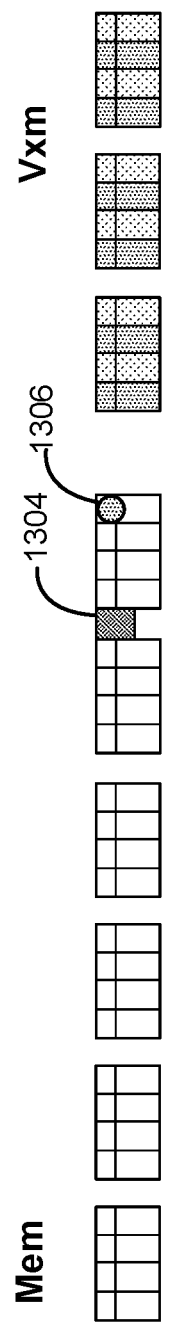
Figure 13C:
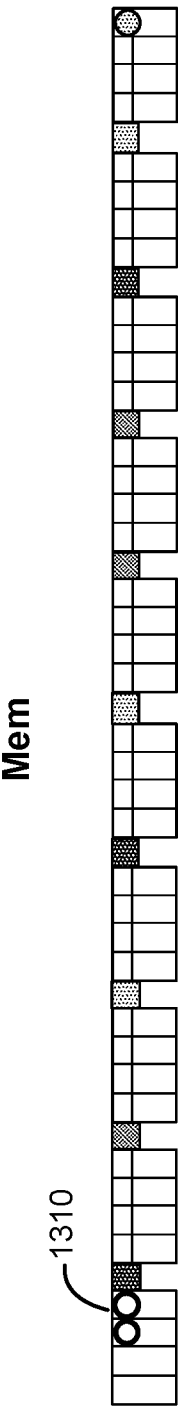

For some embodiments, FIGS. 13A-13C illustrates examples of how stream activity for a particular stream is displayed in the streams view interface. FIG. 13A illustrates a MEM instruction (e.g., a read instruction) producing data on a stream in one direction. As illustrated in FIG. 13A, a colored or shaded circle 1302 (e.g., an orange circle) at the location of a MEM unit indicates production of data by an instruction (e.g., read instruction) at the MEM unit. A grey line emanating from the circle indicates additional functional units available to consume the stream of data. For example, FIG. 13A illustrates a MEM instruction (at MEM W 0—the memory slice closest to the VXM) placing data onto a stream, and during this cycle, the data is available to the three MEM slices to the west of MEM W 0 (i.e., MEM W 1, MEM W 2, and MEM W 3) of the same group of functional units prior to the next stream register. In some embodiments, different types of instructions that produce data to be placed on a stream are associated with different colors.

FIG. 13B illustrates a state of the stream one cycle after that shown in FIG. 13A. As shown in FIG. 13B, the data from the previous cycle (produced by the instruction 1302 shown in FIG. 13A1) has shifted to a next stream register 1304 (indicated by a grey square located between groups of MEM units), and the line indicating the memory slices that have access to the data has also shifted (showing that the data is accessible by the four MEM slices of the next group). In addition, a new colored dot in the same spot as the previous cycle indicates a new instruction 1306 producing data onto the stream at the original memory tile location. In some embodiments, the user obtains additional information relating to the data being transmitted over the stream by selecting the stream register 1304 and/or instruction 1306 (and/or by hovering their cursor over the displayed stream register 1304 and/or instruction 1306). For example, when the user selects the stream register 1304, the visualizer displays (e.g., in the information section of the display, not shown in FIG. 13B), information pertaining to a first instruction which produced the data currently stored in the stream register (e.g., the type of instruction that produced the data), the functional tile that executed the instruction, and a cycle during which the data was produced by the instruction), and information pertaining to a second instruction that the data is intended for (e.g., the type of instruction intended to receive the data, the functional tile that will execute the instruction, and a cycle during which the instruction will receive the data).

FIG. 13C illustrates a state of the stream after a number of additional cycles, where the data placed onto the stream is acted upon. As illustrated in FIG. 13C, during each cycle, data travels in one direction along the stream (e.g., to a next stream register), and new instructions 1308 generate new data placed on the stream. FIG. 13C illustrates circles with grey outlines representing instructions 1310 that consume data from the stream, such as write instructions executed at MEM units. In this case, there are two instructions on adjacent functional units, corresponding to two instructions writing data into different MEM units from the same stream during the cycle.

Figure 14:
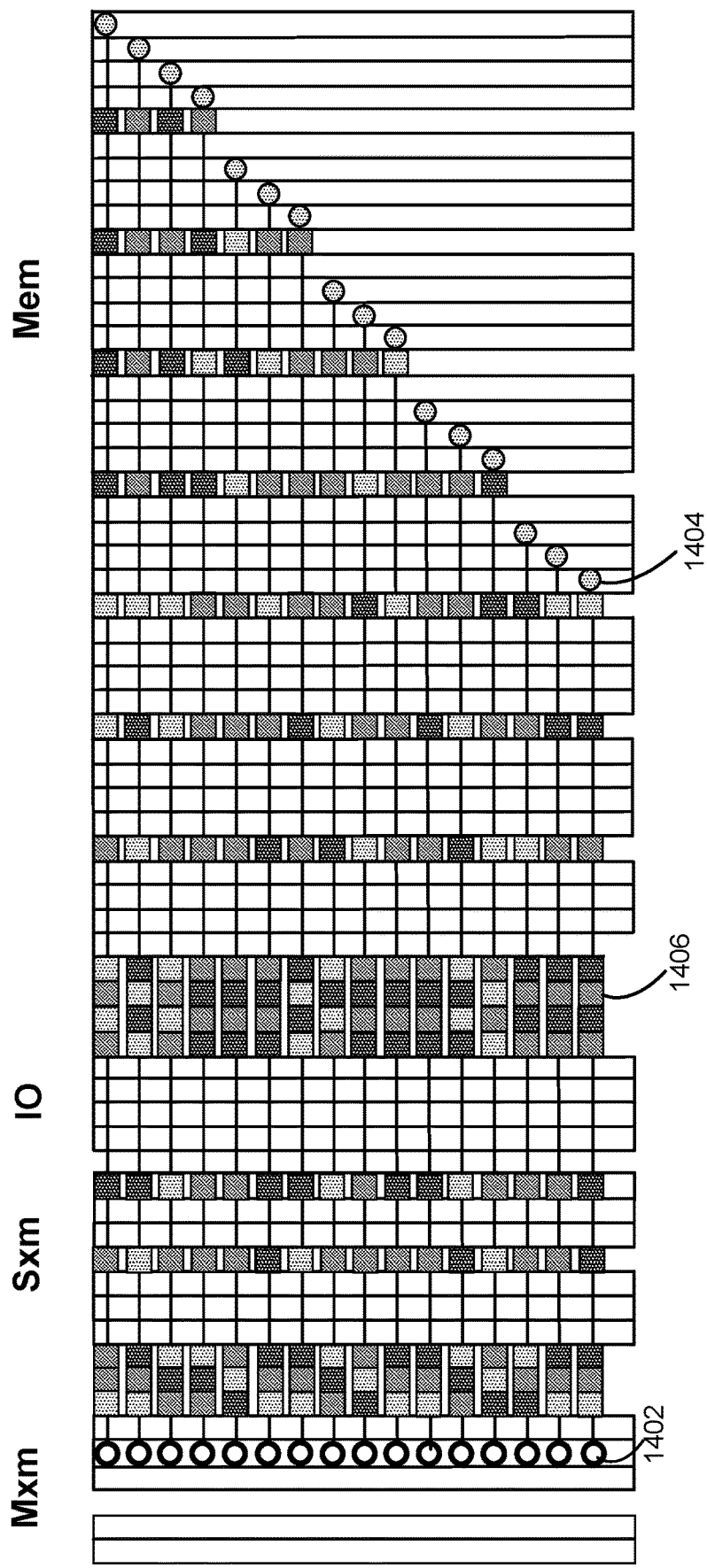
FIG. 14 illustrates an example where a single instruction interacts with multiple streams, in accordance with some embodiments.

For some embodiments, FIG. 14 illustrates an example where a single instruction interacts with multiple streams. As shown in FIG. 14, the grey-outlined circles 1402 correspond to the same MXM install weights instruction, where each circle represents reading of data from a different stream. In addition, during the same cycle, read instructions 1404 at different MEM units read data out onto different streams, and previously produced data is stored at stream registers 1406 as it travels along the streams toward their intended destinations.

Figure 15:
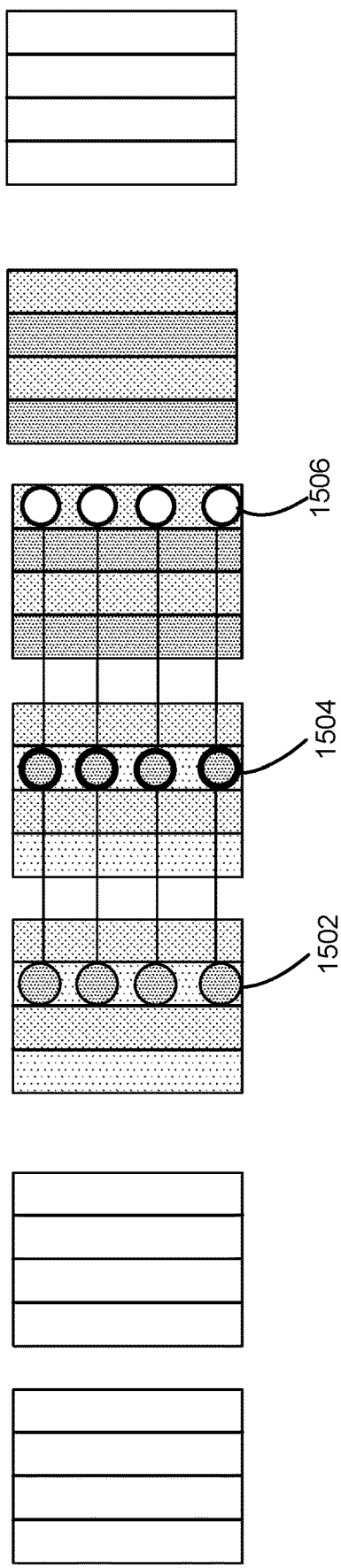
FIG. 15 illustrates an example of a first instruction outputting data onto a stream from a functional unit, while a second instruction causes the functional unit to receive data from the same stream, in accordance with some embodiments.

In some embodiments, it is possible for two different instructions to interact with the same stream on the same functional tile. For example, FIG. 15 illustrates an example of a first instruction outputting data onto a stream from a functional unit, while a second instruction causes the functional unit to receive data from the same stream. FIG. 15 illustrates a plurality of streams in one direction during a given cycle. A first functional unit 1502 executes instructions to output data onto the streams. At the same time, a second functional unit 1504 executes two different instructions (as shown by the displayed circles that are both outlined and filled in) that receives data previously placed on the stream (corresponding to the outlined circle) and places new data onto the stream (corresponding to the filled in circle). In addition, a third functional unit 1506 executes an instruction writing data from the stream into memory during the same cycle.

Conflict Detection in Streams View

In some embodiments, the streams view interface indicates the timing and location of potential conflicts within the program. For example, as discussed above, the streams view interface includes a conflicts display (e.g., issues display 1206 illustrated in FIG. 12) that indicates a number of potential conflicts within the program. Each conflict displayed in the conflicts display indicates a cycle during which the conflict first appears, and a number of subsequent cycles during which the conflict persists. For example, as illustrated in FIG. 12, the program contains a conflict that begins at cycle 856 and persists for 219 cycles. The user selects a particular displayed conflict to immediately cause the cycle slider to advance to the first cycle of the selected error, whereupon the user can examine where the conflict occurs and what data it potentially effects.

Figure 16A:
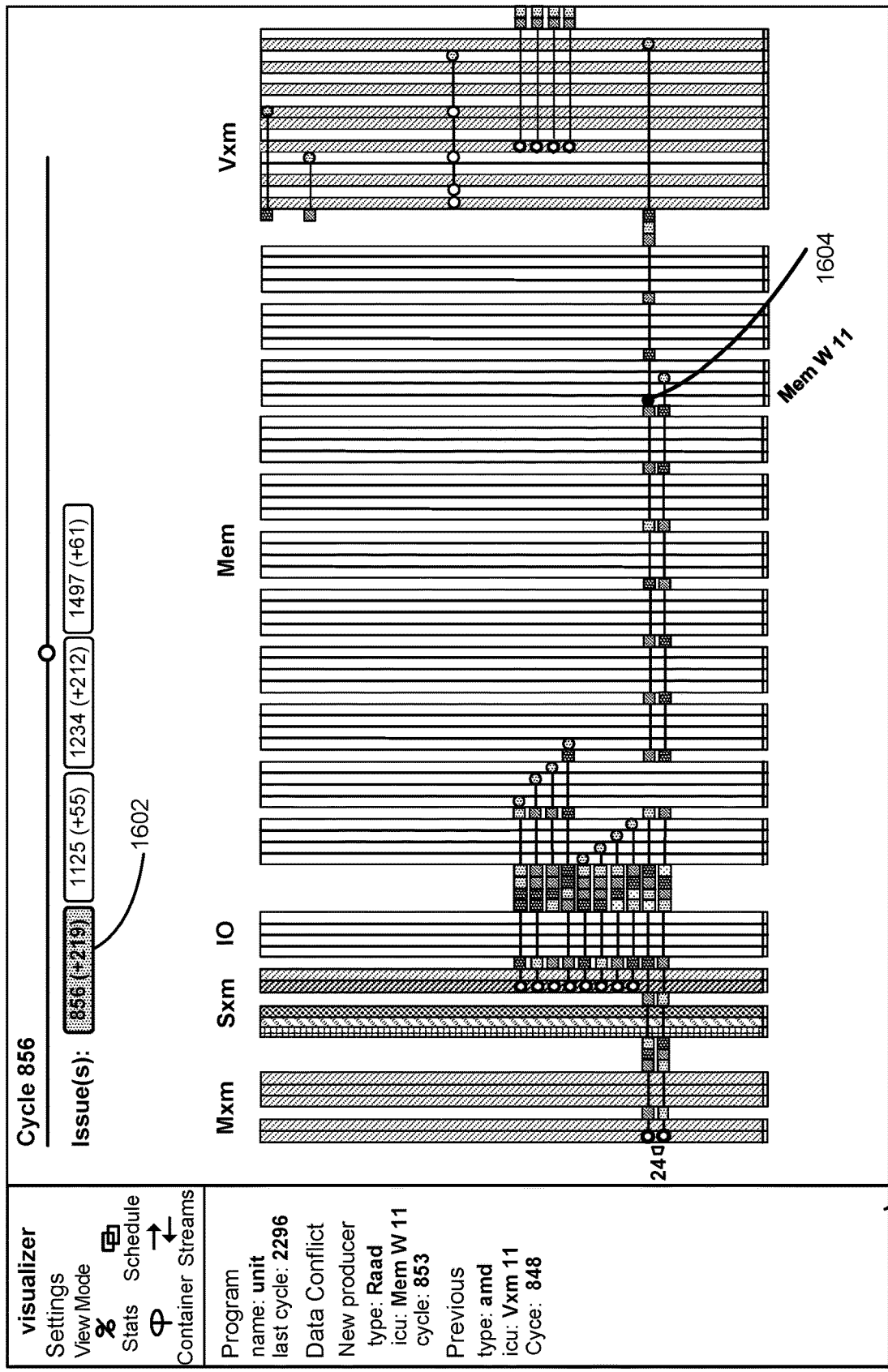
FIGS. 16A and 16B illustrate the streams view interface displaying conflict information, in accordance with some embodiments.
Figure 16B:
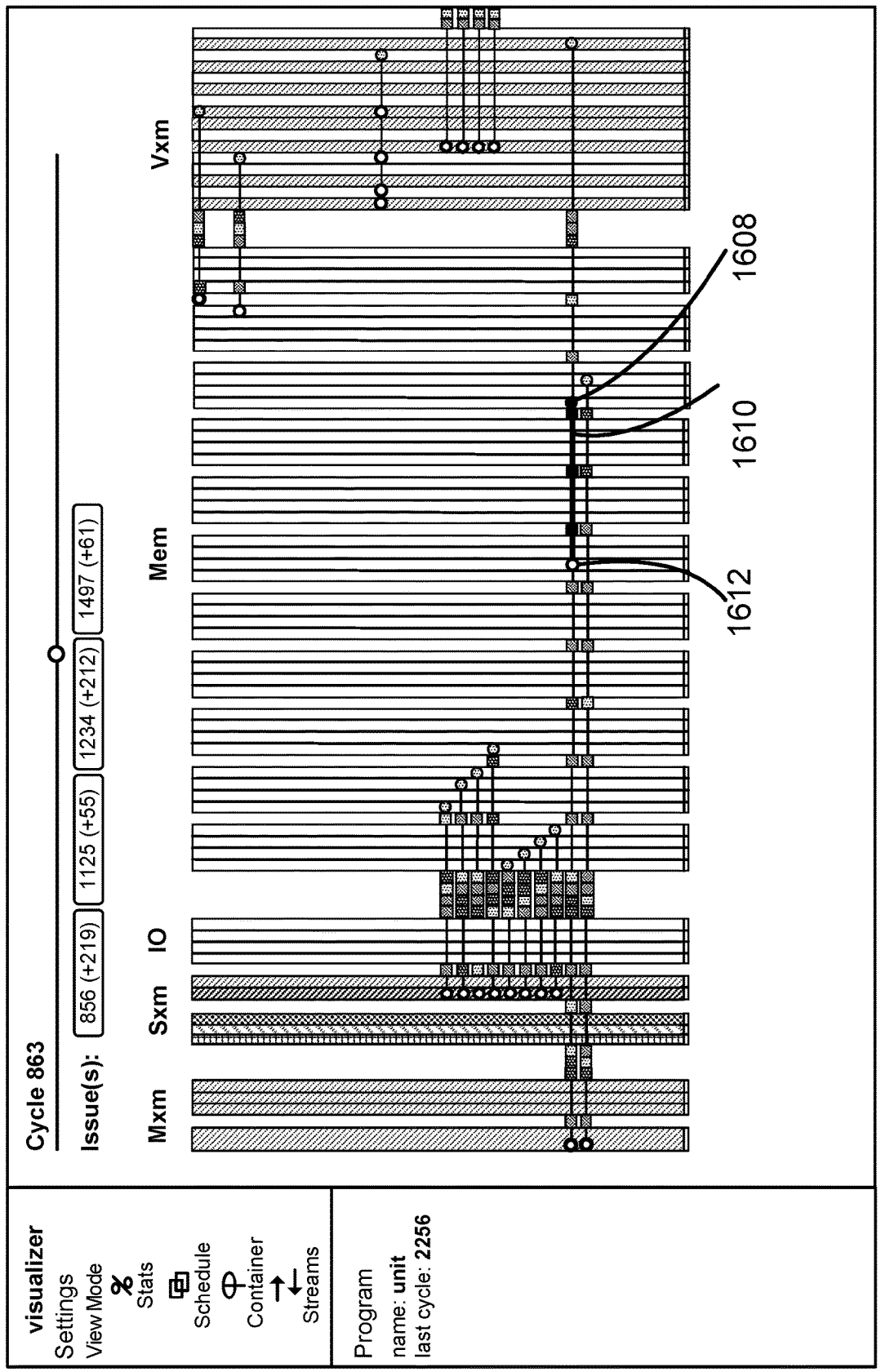

For some embodiments, FIGS. 16A and 16B illustrate the streams view interface displaying conflict information. FIG. 16A illustrates the first cycle of a detected conflict that has been selected by the user (by selecting one of a displayed issue 1602). The first cycle of the selected issue 1602 is associated with a conflict 1604 displayed as a circle of a different color (e.g., red) or shading at the location of the functional unit corresponding to the conflict, and is caused by an instruction executed at a functional unit (e.g., a read instruction at a MEM unit) that outputs data onto the stream when there is already other data present on that portion of the stream. In addition, when the user selects the conflict 1604 (e.g., hovers over the circle representing the conflict with their cursor), information pertaining to the conflict is displayed in the sidebar region 1606, indicating the instruction causing the conflict (e.g., "New Producer", corresponding to a read instruction executed by the MEM W 11 tile beginning on cycle 853), that conflicts with previous data on the stream placed by a previous instruction (e.g., "Previous", corresponding to output from an "and" instruction executed by the VXM 11 tile five cycles earlier, during cycle 848). This conflict causes a subsequent functional unit intended to receive the data output from the previous instruction (e.g., the result of the "and" instruction at VXM 11) to instead receive different data (e.g., the data read from MEM W 11), potentially causing an error.

Sometimes, an issue that causes a data conflict for one instruction is likely to persist to additional instructions over a plurality of cycles, causing subsequent instructions to result in additional data conflicts. FIG. 16B illustrates the streams view interface displaying conflict information several cycles after the initial cycle illustrated in FIG. 16A. As shown in FIG. 16B, the memory tile at which the initial conflict-causing instruction was located (e.g., MEM W 11) may execute additional instructions 1608 causing additional data conflicts. At the same time, the erroneous data caused by previous conflicts continues traveling along the stream, e.g., stored in stream registers along the stream, such as stream register 1610, which is displayed in a different color (e.g., red) or shading to indicate that the data currently stored in the stream register is associated with a previous data conflict and thus may correspond to erroneous data. The lines emanating from the instruction 1608 and stream register 1610 indicating which functional units are able to process the data output by the instruction 1608 and the stream register 1610, respectively, are also marked (e.g., rendered with a different thickness or different color such as red) to indicate that data available to be consumed is associated with a data conflict. In addition, a subsequent functional unit 1612, during the cycle processes erroneous data previously transmitted along the stream.

The user continues stepping through the cycles of the program to view how the erroneous data resulting from the data conflict travels through the stream, such as which stream registers along the stream contain erroneous data during a given cycle, and which subsequent functional units are processing the data. In some embodiments, the streams view interface are used by a user as part of a visual coding tool, in which the user manually configures the instructions of a program to resolve data conflicts and other issues, e.g., by changing a timing of the instructions and/or which streams the instructions produce data on or receive data from, such as changing a stream onto which an instruction outputs data to avoid conflicting with other data along the stream, thus avoiding a potential data conflict.

Example Flows

Figure 17:
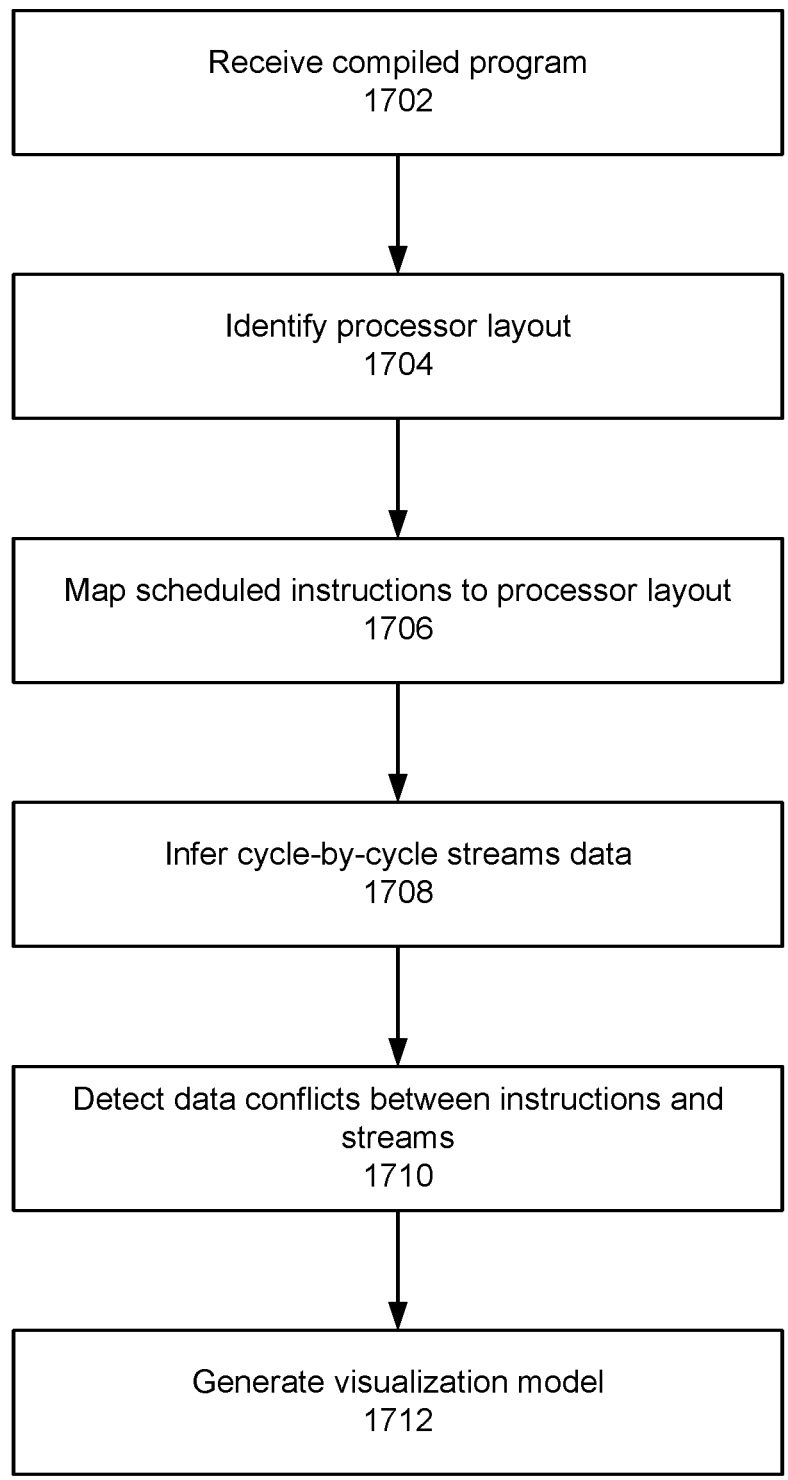
FIG. 17 illustrates a flow chart of a process for generating a visualization corresponding to a compiled program, according to some embodiments.

For some embodiments, FIG. 17 illustrates a flow chart of a process for generating a visualization corresponding to a compiled program. In one embodiment, the process described here is performed by a visualizer (e.g., the visualizer 118 illustrated in FIG. 1A) implemented at a server (e.g., the server 110 or a separate visualization server), that is, a processor executing stored instructions that correspond to the software instructions for the server. While a particular order is shown here, in other embodiments the steps in the flow chart is performed in a different order.

Initially, the visualizer receives 1702 a compiled program. In some embodiments, the compiled program comprises scheduled instructions information (e.g., indicating on which functional units and during which cycles the instructions execute on) and streams information (e.g., indicating input and output streams associated with each instruction). In some embodiments, the compiled program is generated by a compiler responsive to a command by a user containing a specialized flag instructing the compiler to generate the necessary data to be used by the visualizer to generate a visualization model.

The visualizer identifies 1704 a processor layout corresponding to the compiled program. In some embodiments, the compiled program contains an indication of a processor or processor system that the compiled program is intended to run on. The visualizer accesses a database of processor models and identifies an appropriate processor based on the compiled program. In some embodiments, the compiled program is associated with a processor system comprising multiple processors, in which case the visualizer retrieves an existing processor model, or constructs a new model using existing processor models based upon compiler information that indicates how many processors are receiving data for processing and the manner in which those processors are connected.

The visualizer maps 1706 the instructions of the compiled program to the identified processor layout, based on the scheduled instructions and streams information of the compiled program. In some embodiments, the visualizer determines, from the processor model, timing and behavior information of the processor, such as the timing at which data arrives in order to be processed by an instruction, the number of cycles needed by each type of instruction to produce its output, streams accessible to each functional unit of the processor in each direction, a number of cycles needed for data to travel between functional units, etc. The visualizer uses this information to map each scheduled instruction to a corresponding functional unit of the processor, and verifies relationships between instructions (e.g., verify that a timing between a first instruction that produces data to be received by a second instruction is correct).

The visualizer determines 1708, based upon the scheduled instructions, streams data, and processor layout, a cycle-by-cycle picture of how data travels between stream registers along each stream of the processor during execution of the compile program. For example, the visualizer determines which data from which instruction is stored in which stream registers at a given time, based on the known timing of when each instruction reads data onto a stream and when the data is written back into another functional unit.

The visualizer analyzes the cycle-by-cycle streams data to detect 1710 whether any data conflicts are present in the compiled program. For example, the visualizer detects a data conflict if it determines that an instruction to output data onto a stream occurs during a same cycle that other data is traveling through the same portion of the stream. This potentially overwrites the original data on the stream, and causes a subsequent functional unit to instead receive erroneous data.

The visualizer generates 1712 a visualization model of the compiled program. The visualization model comprises the scheduled instructions mapped to the processor layout, the per-cycle streams data indicating movement of data over the stream registers of the processor over time, and information indicating any detected data conflicts. The visualization model is used to display different visualization views to the user indicating the timing and relationships between instructions and the movement of data between the stream registers of a super-lane, as discussed above. In embodiments where the visualization model comprises more than one processor, the visualization view comprises a selected processor flow to display for the user. A user selectively navigates from viewing one processor in the multiple processor view to another.

Figure 18:
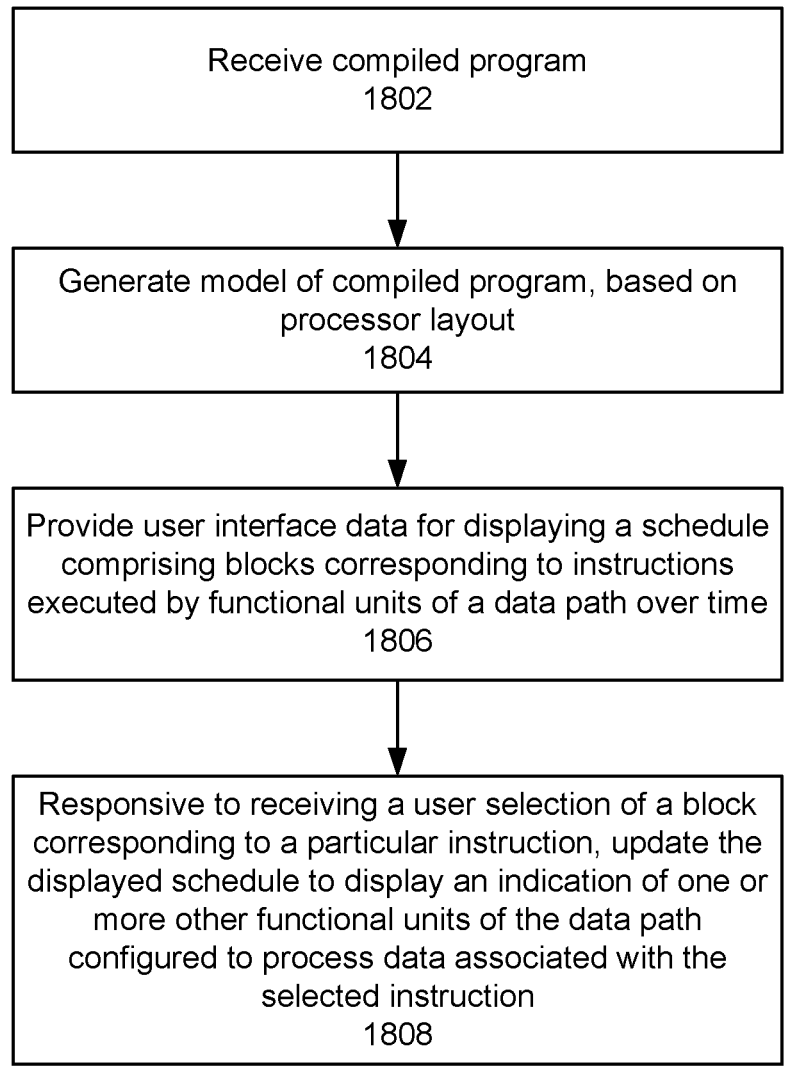
FIG. 18 illustrates a flow chart of a process for generating and interacting with a visualization of a compiled program, in accordance with some embodiments.

For some embodiments, FIG. 18 illustrates a flow chart of a process for generating and interacting with a visualization of a compiled program. The visualizer receives a compiled program 1802 and generates 1804 a visualization model of the compiled program based on a processor layout. In some embodiments, the model is generated using the process discussed above in relation to FIG. 17. As discussed above, in some embodiments, the compiled program specifies instructions to be run on a tensor processor, where the tensor processor comprises one or more data paths (e.g., super-lanes), each comprising a plurality of data lanes (e.g., streams) connecting a row of functional units. Each functional unit is configured to process data received from the data path or output processed data onto the data path to be received by at least one other functional unit along the data path, in accordance with the instructions.

The visualizer provides 1806 user interface data for displaying an interactive user interface. The interactive user interface includes at least a first interface region displaying a schedule comprising interface objects (e.g., blocks) corresponding to instructions received by each functional unit of a data path of the one or more data paths, arranged based upon a time at which each instruction is executed. In some embodiments, the user interface data is used by a visualization client on a user device to generate an interactive user interface.

The generated interactive user interface is configured to, responsive to receiving a user selection of an interface object corresponding to a particular instruction executed by a particular functional unit of the data path, update 1808 the first interface region to display an indication of one or more other functional units of the data path configured to process data associated with the particular instruction upstream or downstream of the selected interface object. In this way, the user views which instructions are executed on which functional units over time to analyze overall utilization of the functional units of the processor and utilization of time, but is also able to drill down on specific instructions, and view relationships between the instruction and other instructions of the program. This allows a user to identify regions and/or time periods of over-utilization or under-utilization of processor resources (such as memory, super-lanes, power supplies, functional units, and instruction queues), as well as identify errors (e.g., data conflicts) relating to specific instructions, and adjust the program accordingly. For example, the user may adjust the instructions associated with the compiled program to provide data at a different rate to increase or decrease utilization of one or more resources (e.g., increase a rate at which read instructions are used to read data from memory, to increase utilization of functional units configured to process the read data). In some embodiments, the visualizer may adjust one or more instructions of the compiled program or generate one or more recommendations to the user for adjusting the instructions, in order to increase or decrease utilization of the resource.

In addition, in some embodiments, the information produced and displayed by the visualizer is used by a compiler designer to identify possible issues with the compiler. For example, the compiler comprises a back-end that determines how instructions are scheduled on the processor, e.g., which functional units of the processor execute which instructions, and at which cycles. The various views provided by the visualizer described above provide a feedback path for analyzing performance of the compiler back-end, enabling a compiler designer to identify potential issues and correct them. For example, in a case where the compiled program results in MXM utilization of the processor "randomly" dropping to a lower than desired level (e.g., to 50%), the designer can use the visualizer (e.g., using the schedule view interface) to determine from which memory banks the data associated with instructions performed by the MXM are drawn from, e.g., determine that the dependent data was striped incorrectly across memory banks that capped the throughput for those shapes. Thus, using the schedule view interface, the designer is able to view how instructions scheduled by the compiler relating to processor memory can lead to under-utilization of the MXM, and can adjust the compiler's banking strategy to address such cases. In one embodiment, a low level API such as the GROQ API (trademark of Groq, Inc.) is used to change the way the data is arranged in memory.

Additional Example Computing System

Figure 19:
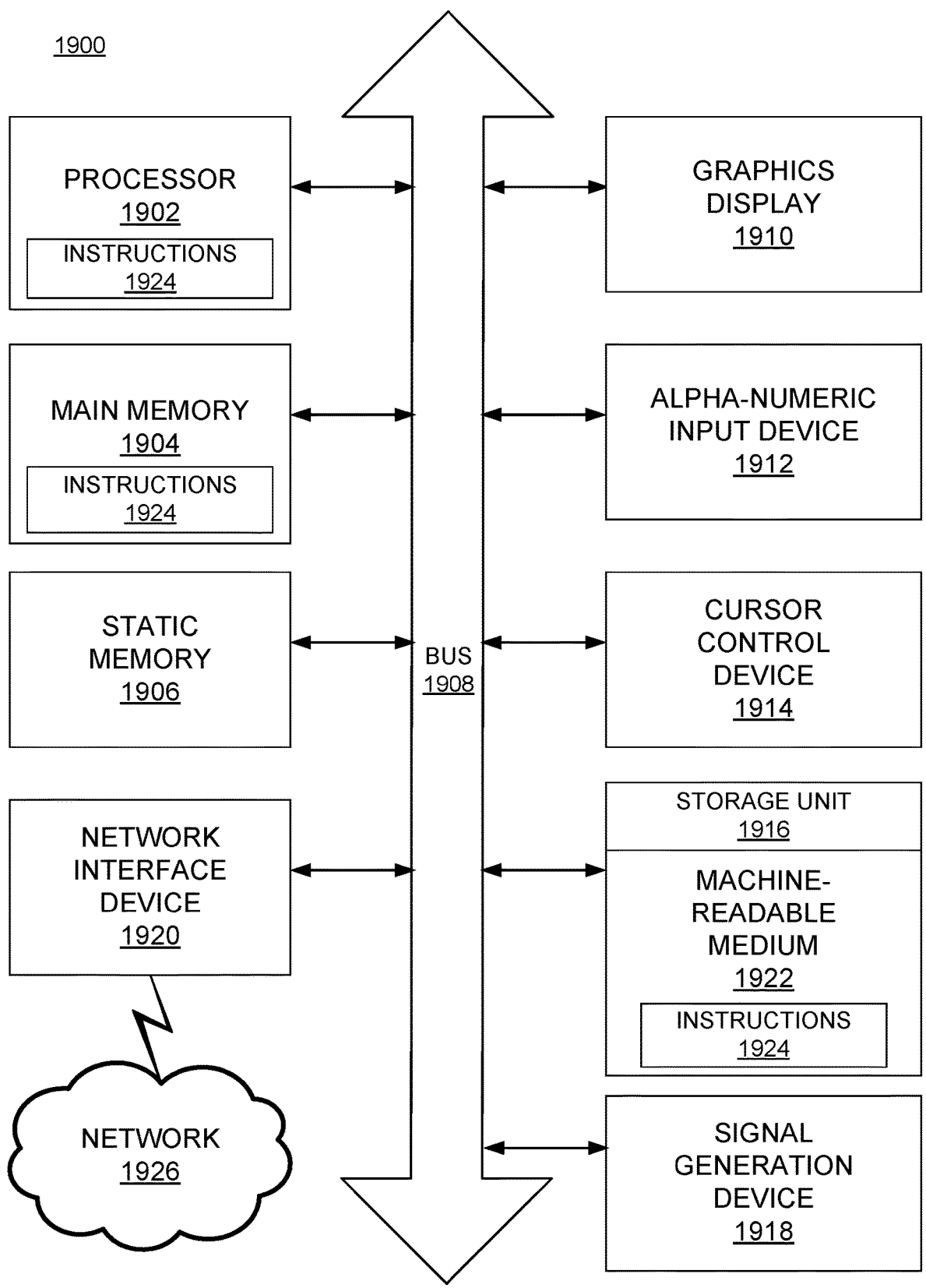
FIG. 19 illustrates a computing machine, in accordance with some embodiments.

FIG. 19 is a block diagram illustrating components of an example computing machine that is capable of reading instructions from a computer-readable medium and executing them in a processor (or controller) according to an embodiment. A computer described herein includes a single computing machine shown in FIG. 19, a virtual machine, a distributed computing system that includes multiple nodes of computing machines shown in FIG. 19, or any other suitable arrangement of computing devices. The computer described herein can be used by any of the elements described in the previous figures to execute the described functions, such as the user device 102, server 110, compiler 112, visualizer 118, etc.

By way of example, FIG. 19 depicts a diagrammatic representation of a computing machine in the example form of a computer system 1900 within which instructions 1924 (e.g., software, program code, or machine code), which can be stored in a computer-readable medium, causing the machine to perform any one or more of the processes discussed herein. In some embodiments, the computing machine operates as a standalone device or is connected (e.g., networked) to other machines. In a networked deployment, the machine operates in the capacity of a server machine or a client machine in a server-client network environment, or as a peer machine in a peer-to-peer (or distributed) network environment.

The structure of a computing machine described in FIG. 19 corresponds to any software, hardware, or combined components shown in the figures above. By way of example, a computing machine is a tensor streaming processor designed and manufactured by GROQ, INC. of Mountain View, California, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1924 that specify actions to be taken by that machine. Further, while only a single machine is illustrated, the term "machine" shall also be taken to include any collection of machines that individually or jointly execute instructions 1924 to perform any one or more of the methodologies discussed herein.

The example computer system 1900 includes one or more processors (generally, a processor 1902) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1904, and a static memory 1906, which are configured to communicate with each other via a bus 1908. The computer system 1900 further includes graphics display unit 1910 (e.g., a plasma display panel (PDP), a liquid crystal display (LCD), a projector, or a cathode ray tube (CRT)). The computer system 1900 can also include alphanumeric input device 1912 (e.g., a keyboard), a cursor control device 1914 (e.g., a mouse, a trackball, a joystick, a motion sensor, or other pointing instrument), a storage unit 1916, a signal generation device 1918 (e.g., a speaker), and a network interface device 1920, which also are configured to communicate via the bus 1908.

The storage unit 1916 includes a computer-readable medium 1922 on which the instructions 1924 are stored embodying any one or more of the methodologies or functions described herein. The instructions 1924 can also reside, completely or at least partially, within the main memory 1904 or within the processor 1902 (e.g., within a processor's cache memory). Thus, during execution thereof by the computer system 1900, the main memory 1904 and the processor 1902 can also constitute computer-readable media. The instructions 1924 can be transmitted or received over a network 1926 via the network interface device 1920.

While the computer-readable medium 1922 is shown in an example embodiment to be a single medium, the term "computer-readable medium" should be taken to include a single medium or multiple media (e.g., a centralized or distributed database, or associated caches and servers) able to store instructions (e.g., the instructions 1924). The computer-readable medium 1922 includes any medium that is capable of storing instructions (e.g., the instructions 1924) for execution by the machine and that cause the machine to perform any one or more of the methodologies disclosed herein. The computer-readable medium 1922 can include, but not be limited to, data repositories in the form of solid-state memories, optical media, and magnetic media. The computer-readable medium 1922 does not include a transitory medium such as a signal or a carrier wave.

Additional Considerations

The disclosed configuration beneficially allows for the creation of a compiled binary for a machine learning model in which the runtime constraints of the compiled binary are known before execution.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA)

or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description should be read to include one or at least one and the singular also includes the plural unless it is obvious that it is meant otherwise.

Upon reading this disclosure, those of skill in the art will appreciate still additional alternative structural and functional designs for a system and a process for compiling a statically scheduled binary for a predictive model. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined.

What is claimed is:

1. A method comprising:
receiving a compiled program specifying a plurality of instructions for processing numerical data to be run on a tensor processor;
generating a visualization model of the compiled program based upon a layout of the tensor processor, wherein the visualization model indicates a predetermined time at which each functional unit of the processor, in a row of functional units that comprise a data path, receives instructions of the plurality of instructions for processing the numerical data, wherein the predetermined time is determined at a compile time by a compiler;
displaying an interactive user interface comprising at least a first interface region displaying a schedule comprising interface objects corresponding to instructions received by each functional unit, arranged based upon a time at which each instruction is executed by its respective functional unit in accordance with the generated visualization model;
responsive to a selection of an interface object corresponding to a particular instruction received at a functional unit, updating the first interface region to display an indication of one or more other functional units configured to process data associated with the instruction before or after the selected interface object.

2. The method of claim 1, further comprising:
updating the user interface, in response to the selection of the interface object corresponding to the instruction within the first interface region, to display, in a second interface region of the user interface, information corresponding to the instruction comprising at least a type of the instruction and the data path that data associated with the instruction is received from or output on.

3. The method of claim 1, further comprising:
displaying, in an additional interface region of the user interface, a structure indicating hierarchical relationships between one or more containers, the one or more containers being data structures of the visualization model, each container associated with a subset of instructions of the plurality of instructions; and
updating, in response to the user selecting a container of the plurality of containers at the additional interface region, the first interface region to indicate which interface objects displayed in the first interface region correspond to instructions associated with the selected container.

4. A method comprising:
receiving a compiled program specifying a plurality of instructions to be run on a tensor processor;
the tensor processor comprising one or more data paths, each comprising a plurality of data lanes connecting a row of functional units, each functional unit configured to process data received from the data path or output processed data onto the data path to be received by at least one other functional unit of the row, in accordance with the plurality of instructions; and
wherein the compiled program comprises data indicating a predetermined timing at which each functional unit of the row receives instructions of the plurality of instructions for processing data, wherein the predetermined timing is determined at a compile time by a compiler;
providing user interface data for displaying an interactive user interface comprising:
an interactive interface objects configured to receive a user selection indicating a time cycle of the compiled program, and displayed intersections between functional units of a data path of the one or more data paths and the plurality of data lanes of the data path in either direction; and
providing, in response to receiving the user selection indicating the time cycle, user interface data to update the user interface to display, indications at each of one or more intersections, each indicating that a functional unit associated with a respective intersection is outputting data onto a data lane associated with the intersection or consuming data from the data lane during the selected time cycle.

5. The method of claim 4, further comprising:
updating, in response to receiving the user selection indicating the time cycle, the user interface to display at least one indication of a stream register located between functional units along the data lane containing data output onto the data lane from a functional unit along the data lane during a previous time cycle.

6. The method of claim 4, further comprising:
identifying a layout corresponding to the processor;
mapping the plurality of instructions to the identified processor layout based upon the predetermined timing specified by the compiled program;
determining a movement of data across the data lanes of a data path of the one or more data paths of the processor, based upon the mapped instructions;
analyzing the mapped instructions and determined movement of data to generate data conflicts information indicating conflicts between data output onto one or more data lanes by the mapped instructions and data movement across the data lanes;
generating a visualization model of the compiled program based upon the mapped instructions, determined data movement, and data conflicts information, wherein a model represents a schedule indicating execution of instructions and data movement over time of the compiled program when run on the processor;
wherein the user interface is updated responsive to receiving the user selection to display the indication based on the generated visualization model.

7. The method of claim 6, further comprising,
receiving a user selection indicating a time cycle;
determining that the selected time cycle is associated with a data conflict indicated by the generated data conflicts information, the data conflict corresponding to an intersection of the one or more intersections;
providing user interface data to update the user interface to display, an indication at the intersection that the functional unit is outputting data onto the data lane during the selected time cycle that conflicts with data being transmitted along the data lane during the selected time cycle.

8. The method of claim 4, wherein the interactive user interface displays streams of data in the processor, each stream comprising a plurality of stream registers, and is configured to depict in a first cycle, at a first functional unit of the processor corresponding to a first memory tile, first data produced by a first instruction being shifted from a first stream register to a second stream register, and depicting, in a second cycle, a second instruction producing second data onto the first stream register at the first memory tile and repeating for a selected number of cycles.

9. The method of claim 8, wherein the interactive user interface is further configured to depict information relating to the data transmitted over the plurality of stream registers, responsive to the user selecting one of the plurality of stream registers.

10. The method of claim 9 wherein the interactive user interface depicts, upon user selection of one of the plurality of stream registers, information pertaining to a first instruction which produced the data currently stored in the selected stream register.

11. The method of claim 10 wherein the interactive user interface is configured to depict information relating to the plurality of instructions by hovering a cursor over one of the displayed plurality of instructions.

12. The method of claim 11 wherein the displayed information is selected from at least one of the following: the type of instruction that produced the data, the functional tile that executed the instruction, the cycle during which the data was produced by the instruction.

13. The method of claim 11 wherein the displayed information pertains to a second instruction that will operate on the data in a subsequent cycle.

14. A system comprising:
one or more non-transitory computer-readable media storing a compiler configured to:
  receive program code to be run on a tensor processor;
  generate a compiled program from the received program code, the compiled program specifying a plurality of instructions to be run on the tensor processor;
  wherein the tensor processor comprises one or more data paths, each comprising a plurality of data lanes connecting a row of functional units, each functional unit configured to process data received from the data path or output processed data onto the data path to be received by at least one other functional unit of the row, in accordance with the plurality of instructions; and
  wherein the compiled program includes information for a visualization model for a visualizer indicating a predetermined timing at which each functional unit of the row receives data along a first data path and instructions of the plurality of instructions along a second data path for processing data, wherein the predetermined timing is determined at a compile time by the compiler, and wherein the visualizer is configured to display a user interface for visualizing data indicative of the predetermined timing.

15. The system of claim 14 further comprising:
the visualizer configured to:
  receive the compiled program;
  identify a layout corresponding to the processor;
  map the instructions to the identified processor layout based upon the predetermined timing specified by the compiled program;
  determine a movement of data across the data lanes of a data path of the one or more data paths of the processor, based upon the mapped instructions;
  analyze the mapped instructions and determined movement of data to generate data conflicts information indicating conflicts between data output onto one or more data lanes by the plurality of mapped instructions and data movement across the data lanes;
  generate a visualization model of the compiled program based upon the mapped instructions, determined data movement, and data conflicts information, wherein the model represents a schedule indicating execution of instructions and data movement over time of the compiled program when run on the processor;
  generate an interactive user interface at the user device to display an interactive interface object configured to receive a user selection indicating a time cycle of the compiled program, and a diagram of intersections between functional units of a data path of the one or more data paths and data lanes of the data paths; and
  update, in response to receiving the user selection indicating the time cycle, the displayed diagram to display, indications at each of one or more intersections, each indicating that a functional unit associated with a respective intersection is outputting data onto a data lane associated with the intersection or consuming data from the data lane during the selected time cycle, as indicated by the visualization model.

16. The system of claim 15 wherein the visualization model corresponds to one or more processors selected by the user from a plurality of processor types.

17. A system of claim 14, further comprising:
a visualizer configured to:
  receive the compiled program;
  map the instructions to a processor layout based upon a predetermined timing specified by the compiled program;
  determine a movement of data across a data path of functional units, based upon the mapped instructions;
  analyze the mapped instructions to determine use of processor resources;
  generate an indicator if use of processor resources is lower than a selected level;
  determine a functional unit that provided at least a portion of the data associated with the mapped instructions;
  generate a visualization model of the compiled program; and
  graphically depict how scheduled instructions lead to underutilization of the processor resource and adjust the instructions to provide data at a different rate to increase use of the resource.

18. The system of claim 17 wherein the processor resource is a memory, super-lane, power supply, functional unit, or instruction queue.

19. The system of claim 18 further comprising:
an Application Program Interface configured to adjust an initial banking strategy of the memory to increase the utilization rate by rewriting at least one of the scheduled instructions.

* * * * *